(12) United States Patent
Sharma et al.

(10) Patent No.: US 12,443,243 B2
(45) Date of Patent: Oct. 14, 2025

(54) HYBRID COMPUTING DEVICE, APPARATUS AND SYSTEM

(71) Applicant: Intel Corporation, Santa Clara, CA (US)

(72) Inventors: Sameer Sharma, Santa Clara, CA (US); Gadi Amit, San Mateo, CA (US); Yoshikuzu Hoshino, San Francisco, CA (US); Chadwick Harber, San Francisco, CA (US); Daniel Clifton, San Francisco, CA (US); Kenneth Jasinski, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 18/196,831

(22) Filed: May 12, 2023

(65) Prior Publication Data

US 2023/0315164 A1 Oct. 5, 2023

Related U.S. Application Data

(63) Continuation of application No. 17/012,508, filed on Sep. 4, 2020, now Pat. No. 11,693,453, which is a
(Continued)

(51) Int. Cl.
*G06F 1/16* (2006.01)
*G06F 3/04817* (2022.01)
*G06F 3/04842* (2022.01)

(52) U.S. Cl.
CPC .......... *G06F 1/1681* (2013.01); *G06F 1/1626* (2013.01); *G06F 1/1632* (2013.01);
(Continued)

(58) Field of Classification Search
None
See application file for complete search history.

(56) References Cited

U.S. PATENT DOCUMENTS

| 8,424,829 B2 | 4/2013 | Lu et al. |
| 12,094,393 B2 * | 9/2024 | Kwon ............ G09G 5/38 |

(Continued)

FOREIGN PATENT DOCUMENTS

| CN | 1475893 A | 2/2004 |
| CN | 2715216 | 8/2005 |

(Continued)

OTHER PUBLICATIONS

International Search Report and Written Opinion, Mailed Date: Dec. 10, 2012, Application No. PCT/US2012/034384, Filed Date: Apr. 20, 2012, pp. 10.

(Continued)

*Primary Examiner* — Imani N Hayman
*Assistant Examiner* — Rashen E Morrison
(74) *Attorney, Agent, or Firm* — Alliance IP, LLC

(57) ABSTRACT

Embodiments of an apparatus and system are described for a hybrid computing device. Some embodiments may comprise a computing device having an enclosure arranged to support a display on a front of the enclosure and a cover mechanically coupled to a side of the enclosure, the cover comprising a first portion having at least one integrated input device and a second portion having at least one flexible seam arranged to allow the second portion to adjustably pivot around the seam. Other embodiments are described and claimed.

20 Claims, 18 Drawing Sheets

Related U.S. Application Data continuation of application No. 16/169,140, filed on Oct. 24, 2018, now abandoned, which is a continuation of application No. 13/977,063, filed as application No. PCT/US2012/034384 on Apr. 20, 2012, now Pat. No. 10,114,423.

(52) U.S. Cl.
CPC ........ *G06F 1/1666* (2013.01); *G06F 3/04817* (2013.01); *G06F 3/04842* (2013.01); *G06F 2200/1634* (2013.01)

(56) References Cited

U.S. PATENT DOCUMENTS

| | | |
|---|---|---|
| 2001/0033269 A1 | 10/2001 | Hosoya |
| 2004/0005184 A1 | 1/2004 | Kim et al. |
| 2010/0122924 A1 | 5/2010 | Andrews |
| 2011/0147398 A1 | 6/2011 | Ahee et al. |
| 2011/0267757 A1 | 11/2011 | Probst et al. |
| 2011/0284420 A1 | 11/2011 | Sajid |
| 2011/0290686 A1 | 12/2011 | Huang |
| 2011/0294420 A1 | 12/2011 | Hebiguchi et al. |
| 2012/0037523 A1 | 2/2012 | Diebel et al. |
| 2012/0068798 A1 | 3/2012 | Lauder et al. |
| 2012/0194448 A1* | 8/2012 | Rothkopf .............. G06F 1/1643 361/679.01 |
| 2013/0114098 A1 | 5/2013 | LeGrande |
| 2014/0159867 A1 | 6/2014 | Sartee et al. |

FOREIGN PATENT DOCUMENTS

| | | |
|---|---|---|
| CN | 201360269 | 12/2009 |
| CN | 201360269 Y | 12/2009 |
| CN | 101957640 A | 1/2011 |
| CN | 101976099 A | 2/2011 |
| CN | 201757870 | 3/2011 |
| CN | 201757870 U | 3/2011 |
| CN | 201892918 U | 7/2011 |
| CN | 102156510 A | 8/2011 |
| CN | 201945916 U | 8/2011 |
| CN | 102215714 A | 10/2011 |
| CN | 202058058 U | 11/2011 |
| CN | 102331822 A | 1/2012 |
| CN | 102419621 A | 4/2012 |
| CN | 202189303 U | 4/2012 |
| TW | 201022882 A | 6/2010 |
| TW | M422282 U | 2/2012 |

OTHER PUBLICATIONS

Office Action and Search Report received for Taiwanese Patent Application No. 102112998, mailed Oct. 26, 2016, 13 pages including 1 page English translation.
Office Action received for Chinese Patent Application No. 20128007195.7, mailed May 31, 2017, 21 pages.
CNIPA Notice of First Office Action and Search Report in CN Patent Application Serial No. 202011021956.1 mailed on Oct. 27, 2023 (with translation) 22 pages.
Chinese Office Action received in Application No. 202011021956.1, dated May 27, 2024, with English translation, 18 pages.
Chinese Office Action received in Application No. 202011024357.5, dated Mar. 18, 2024, with Statement of Relevance, 9 pages.
Chinese Office Action received in Application No. 202011021956.1, dated Sep. 23, 2024, with Statement of Relevance, 4 pages.
Chinese Office Action received in Application No. 202011024357.5, dated Sep. 11, 2024, with Statement of Relevance, 6 pages.
Chinese Office Action received in Application No. 202011021956.1, dated Dec. 11, 2024, with English translation, 19 pages.
Chinese Office Action received in Application No. 202011024357.5, dated Dec. 23, 2024, with Statement of Relevance, 6 pages.
Chinese Office Action received in Application No. 202011024357.5, dated Feb. 17, 2025, with English translation, 11 pages.

* cited by examiner

HYBRID COMPUTING DEVICE, APPARATUS AND SYSTEM

CROSS-REFERENCE TO RELATED APPLICATIONS

This application is a continuation of, claims the benefit of and priority to previously filed U.S. patent application Ser. No. 17/012,508, filed Sep. 4, 2020, entitled "HYBRID COMPUTING DEVICE, APPARATUS AND SYSTEM", which is a continuation of, claims the benefit of and priority to previously filed U.S. patent application Ser. No. 16/169, 140, filed Oct. 24, 2018, entitled "HYBRID COMPUTING DEVICE, APPARATUS AND SYSTEM", which is a continuation of, claims the benefit of and priority to previously filed U.S. patent application Ser. No. 13/977,063, filed Jun. 28, 2013, issued on Oct. 30, 2018 as U.S. Pat. No. 10,114, 423, which is a U.S. national stage entry of PCT/US2012/034384, filed Apr. 20, 2012, which are hereby incorporated by reference in their entireties.

BACKGROUND

The performance and capabilities of modern computing systems have increased rapidly in recent years. Many computing system today include one or more processors, memory, wireless connectivity, displays and other components requiring electrical power. The number and type of capabilities and components in modern computing systems continues to increase while the systems continue to decrease in size, resulting in limited space for the different components necessary to implement the increased capabilities and diverse usage scenarios. Moreover, modern mobile computing systems are often used in a variety of different locations and usage scenarios which require ergonomically designed systems to limit the size of the systems while ensuring a satisfactory and dynamic user experience. As a result, it is desirable to improve mobile computing device designs. Consequently, there exists a substantial need for techniques to adapt mobile computing devices to accommodate components in an ergonomically efficient design.

DETAILED DESCRIPTION

The embodiments are generally directed to a hybrid computing device, apparatus and system. Various embodiments provide a system and apparatus that include an enclosure arranged to support a display on a front of the enclosure and a cover mechanically coupled to a side of the enclosure, the cover comprising a first portion having at least one integrated input device and a second portion having at least one flexible seam arranged to allow the second portion to adjustably pivot around the seam. Other embodiments are described and claimed.

The processing power and capabilities of modern mobile computing devices continues to increase, often resulting in increased functionality requirements. For example, in some embodiments it may be advantageous for a mobile computing device to include one or more input devices to allow for data entry and device control. Currently available input devices do not provide a good user experience and typing or performing other interactive actions on a display screen may be ergonomically uncomfortable. Moreover, Bluetooth keyboards and other currently available input devices may be cumbersome for a user to transport. Additionally, as the requirements for smaller devices with multifunction form factors continue to increase, it may be advantageous for input devices to provide additional functionality, such as acting as a stand or support for the computing device or offering physical protection for the computing device. Therefore, some embodiments described herein are directed to techniques for a combined computing device and multifunction cover. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
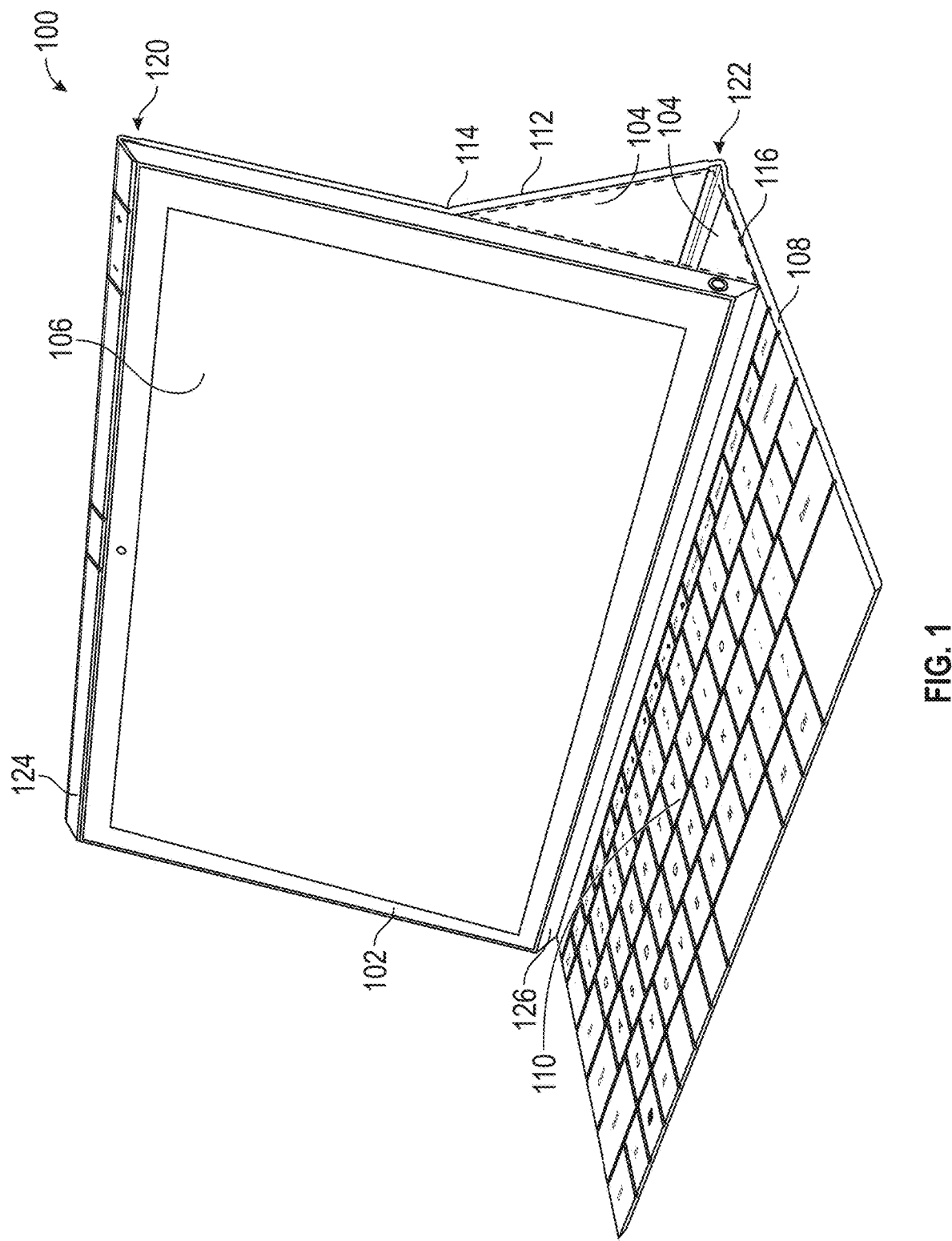
FIG. 1 illustrates one embodiment of a first system.

FIG. 1 illustrates one embodiment of a mobile computing device or system 100. In various embodiments, the mobile computing device 100 may comprise multiple nodes, elements or components. A node, element or component generally may comprise any physical or logical entity in the mobile computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the mobile computing device 100 may comprise a tablet computer, handheld computer, laptop computer, clamshell computer, netbook computer, ultra-book computer, personal digital assistant (PDA), cellular telephone, combination cellular telephone/PDA, smartphone, portable computer, pager, messaging device, media player, digital music player, or other suitable computing device. Various embodiments described herein include reference to a tablet computing device including a combination input device and cover mechanically coupled thereto. The embodiments are not limited in this context.

Mobile computing device 100 may comprise a device operative to form part of a wired communications system, a wireless communications system, or a combination of both. For example, the mobile computing device 100 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, coaxial cable, fiber optic connection, and so forth. The mobile computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems-Local and Metropolitan Area Networks-Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 100 illustrates one possible computing device in some embodiments. In various embodiments, mobile computing device 100 may include enclosure 102, cover 104, display 106, and input device 110. While not shown in FIG. 1, in some embodiments the mobile computing device 100 may include one or more platform component(s) including but not limited to one or more processor circuits or memory. While a limited number and arrangement of components are shown in FIG. 1 for purposes of illustration, it should be understood that mobile computing device 100 may include any number or arrangement of components and still fall within the described embodiments. For example, mobile computing device 100 may additionally include, in some embodiments, memory containing instructions to be executed by one or more multi-core processors for example. The embodiments, however, are not limited to the elements or the configuration shown in this figure. Additional components for mobile computing device 100 are discussed in further detail below with reference to FIG. 18.

While not shown in FIG. 1, mobile computing device 100 may include one or more processor circuits and/or memory in some embodiments. A processor or processor circuit may comprise any suitable electric device, semiconductor device, system on chip or other component in some embodiments. For example, a processor circuit may comprise a multi-core processor in various embodiments. In some embodiments, a processor circuit may include or comprise one or more radio modules or combination transmitter/receiver (e.g. transceiver) devices. In various embodiments, the transceiver device may comprise a device that has both a transmitter and a receiver that are combined and share common circuitry or a single housing. For example, in some embodiments, the transceiver may be operative to enable wireless communication capabilities for mobile computing device 100. Other embodiments are described and claimed.

Mobile computing device 100 may also include memory in some embodiments. The memory may comprise any suitable physical device operative to store data, programs, sequences of instructions or other information on a temporary or permanent basis for use in mobile computing device 100 in some embodiments. For example, memory may comprise volatile or non-volatile memory, RAM, ROM, virtual memory, solid state disk drive or a hard disc drive for example. The embodiments are not limited in this context. Additional or alternative platform components are discussed in more detail with reference to FIG. 18.

In some embodiments, display 106 may comprise any suitable visual interface for displaying content to a user of the mobile computing device 100. In one embodiment, for example, the display 106 may be implemented by a liquid crystal display (LCD) or a touch-sensitive color LCD screen. The touch-sensitive LCD may be responsive to human touch or may be used with a stylus and/or a handwriting recognizer program in some embodiments. In other embodiments, display 106 may comprise a plasma display, light-emitting diode (LED) display or an organic light-emitting diode (OLED) display. Display 106 may comprise a digital touchscreen display arranged to occupy a substantial portion of a first side of a computing device 100 in some embodiments.

Mobile computing device 100 may include one or more energy storage modules (not shown) in some embodiments. The energy storage modules may comprise any device suitable for providing electrical power to computing device 100 in various embodiments. For example, the one or more energy storage modules may comprise a battery or a plurality of batteries or other energy storage devices capable of storing and providing power to computing device 100. In some embodiments, the one or more energy storage modules may comprise cylindrically shaped batteries or flat packed batteries, such as Lithium Ion or other suitable battery technology. Other embodiments are described and claimed.

In various embodiments, mobile computing device 100 may include one or more sensors (not shown). The one or more sensors may comprise one or more of a camera, accelerometer, proximity sensor, light sensor, compass or global positioning system (GPS) in some embodiments. The one or more sensors of mobile computing device 100 may be arranged to provide various different functionality for the device 100, such as tilt sensing, rotating one or more user interface elements displayed on display 106 or any other suitable function as one skilled in the art would readily understand. Other embodiments are described and claimed.

Mobile computing device 100 may include an enclosure 102 in some embodiments. Enclosure 102 may comprise an enclosure, housing, case or other device suitable to support, surround, protect or enclose one or more computing components for computing device 100. For example, enclosure 102 may comprise a rigid plastic or metal body that surrounds or supports one or more computing components for computing device 100. In various embodiments, enclosure 102 may comprise the body or main portion of a tablet computer and may additionally include, support or comprise memory, one or more wireless transceivers operative to enable wireless communications for the computing device using one or more wireless communication protocols, one or more energy storage modules, display 106 or any other suitable component of computing device 100. Other embodiments are described and claimed.

In some embodiments, enclosure 102 may be designed to have a thin and sleek form factor in accordance with many modern computing system designs. While the embodiments are not limited in this respect, enclosure 102 may comprise a form factor similar to a tablet computing device in some embodiments. In various embodiments, enclosure 102 may be arranged to support display 106 on front or front side of enclosure 102 as shown in FIG. 1.

Computing device 100 may additionally include or comprise cover 104 in some embodiments. Cover 104 may comprise a slim and sturdy cover, case or other protective housing or means arranged to adjustably cover, conceal and/or protect various portions of enclosure 102. In some embodiments, cover 104 may be adjustably arranged to support the enclosure 102 of computing device 100 in a plurality of different modes, such as an open clamshell mode, first tablet mode, second tablet mode, or closed mode. In various embodiments, cover 104 may be constructed of any suitable material including but not limited to plastic, rubber, fabric, polyurethane or metal, for example. The embodiments are not limited in this respect.

In some embodiments, the cover may comprise a first portion 108 and a second portion 112. The first portion 108 and second portion 112 may be mechanically coupled together to form cover 104. For example, first portion 108 and second portion 112 may be coupled together by a hinge, seam or other coupling mechanism that allows the first portion 108 and second portion 112 to rotate with respect to one another around a pivot point defined by the coming together of the first portion 108 and the second portion 112. For example, in some embodiments, the first portion 108 and the second portion 112 may be coupled together by a fabric hinge. Other embodiments are described and claimed.

In various embodiments, the first portion 108 of the cover 104 may comprise or include at least one integrated input device including but not limited to the input device 110. For example, the integrated input device 110 may comprise a keyboard and/or trackpad or pointing device. In some embodiments, the integrated input device may comprise a QWERTY keyboard for example. Unlike many "afterthought" tablet computing solutions currently available with an accessory keyboard, the hybrid computing device 100 comprises a fully integrated design solution arranged to provide the touchscreen interaction and capabilities of a tablet computing device and the touch-typing experience of a clamshell, laptop or netbook computer in a compact, practical and aesthetically pleasing platform.

The second portion 112 of cover 104 may comprise at least one flexible seam 114 arranged to allow the second portion 112 to adjustably pivot around the seam 114. As described hereinafter, a seam may comprise a hinge, seam or other flexible mechanisms suitable to allow one component to rotate with respect to another component. For example, as shown in FIG. 1, the seam 114 may be positioned approximately in the middle of second portion 112 to allow second portion 112 to rotate around the seam 114. While a single seam 114 is shown in FIG. 1 for purposes of illustration, one skilled in the art would readily understand that any number of seams could be used and still fall within the described embodiments. As such, the embodiments are not limited in this respect.

In various embodiments, cover 104 may be mechanically coupled to a side of the enclosure 102. For example, a first end 120 of the second portion 112 of the cover 104 may be mechanically coupled to a first side 124 of the enclosure 102 and a second end 122 of the second portion 112 opposite the first end 120 may be pivotally coupled to the first portion 108. The mechanical computing may comprise a permanent or fixed attachment point arranged to adjustably or rotatably couple the enclosure 102 and the cover 104 together. For example, a first end 120 of the second portion 112 of the cover 104 may be mechanically coupled to a first side 124 of enclosure 102 in some embodiments. While the first end 120 is shown as being coupled to the first side 124 in FIG. 1, it should be understood that cover 104 could be mechanically coupled to a different side of enclosure 102 or on more than one side of enclosure 102 and still fall within the described embodiments. For example, in some embodiments a second end 122 of the second portion 112 of cover 104 may be coupled to a second side 126 of enclosure 102 as described in more detail with reference to FIGS. 9-17. Other embodiments are described and claimed.

In some embodiments, one or more electrical and/or mechanical connectors or other coupling mechanisms may be included to communicatively couple the input device 110 of the cover 104 to the computing components supported by enclosure 102. For example, the one or more connectors or coupling mechanisms may provide an electrical or other communication connection between the keyboard and/or trackpad of the input device 110 and the processor or other suitable component of computing device 100 supported by enclosure 102. While described herein as including an electrical connection to enable communication between the computing device 100 and the input device 110, it should be understood that any suitable communication technology could be used and still fall within the described embodiments. For example, the computing device 100 and the input device 110 may be equipped with Bluetooth or another suitable wireless technology to allow wireless communication between the devices in some embodiments. Other embodiments are described and claimed.

In various embodiments, FIG. 1 illustrates one embodiment of hybrid computing device 100 arranged in a clamshell or laptop mode or configuration. For example, as shown in FIG. 1, the second portion 112 may be arranged to form a triangular stand 116 to support the enclosure 102 in an open configuration. In some embodiments, the display 106 and the input device 110 may be arranged to be accessible and operable in the open configuration. In various embodiments, with the display 106 in the configuration shown in FIG. 1, the hybrid computing device 100 may be operable as a clamshell or laptop computer, enabling a user to interact with the touch-sensitive display 106 and also to control the device 100 or enter data using the input device 110. In some embodiments, the input device 110 may comprise an 18.5 mm button pitch full size keyboard that provides a traditional touch-typing experience. The embodiments are not limited in this respect.

Figure 2:
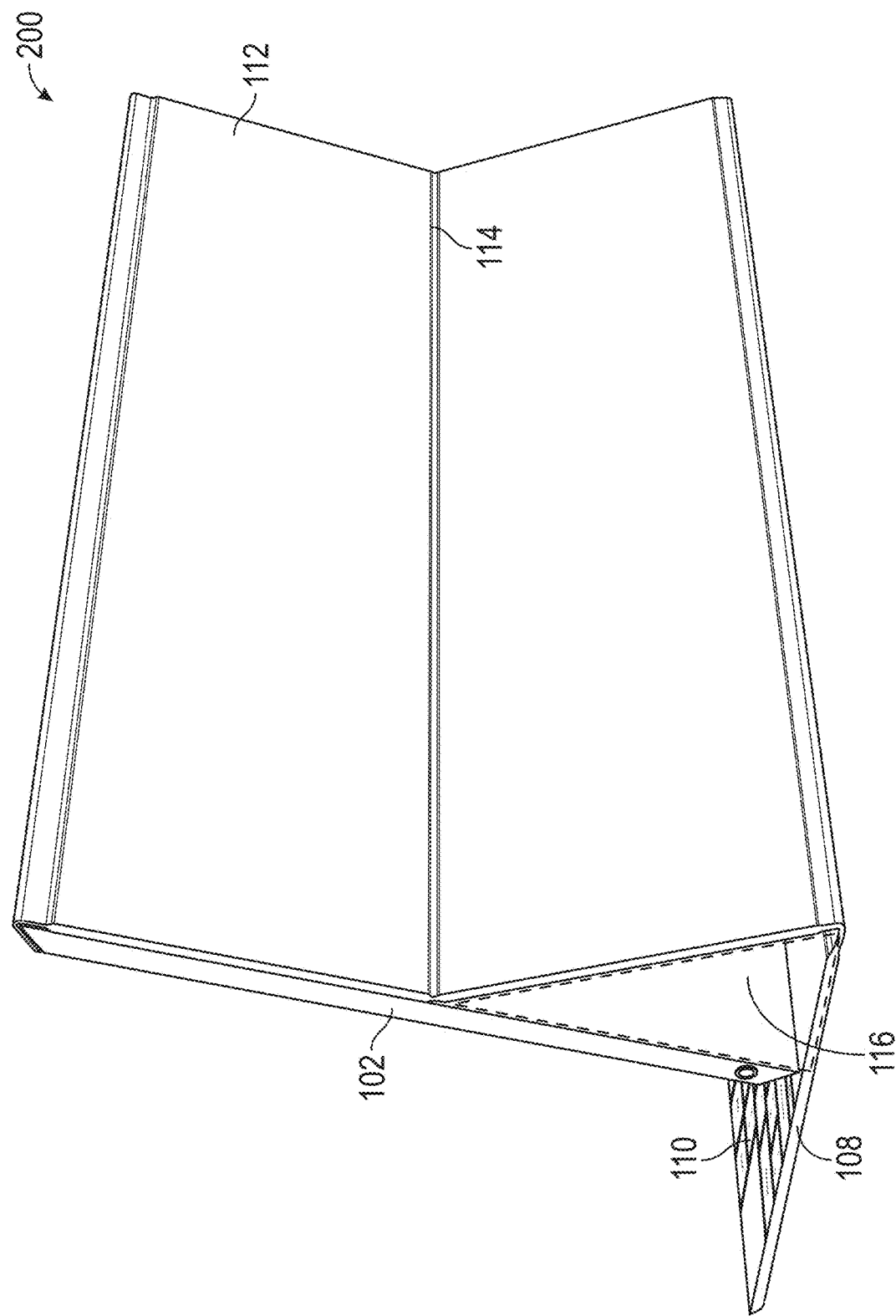
FIG. 2 illustrates one embodiment of a second system.

FIG. 2 illustrates one embodiment of a system 200. The system 200 may comprise a hybrid computing device 200 that may be the same or similar to hybrid computing device 100 of FIG. 1 where like elements are similarly numbered. In various embodiments, FIG. 2 may illustrate a back perspective view of computing device 200 which more clearly illustrates the seam 114 that allows the second portion 112 to flex or bend, creating the triangular stand 116.

Figure 3:
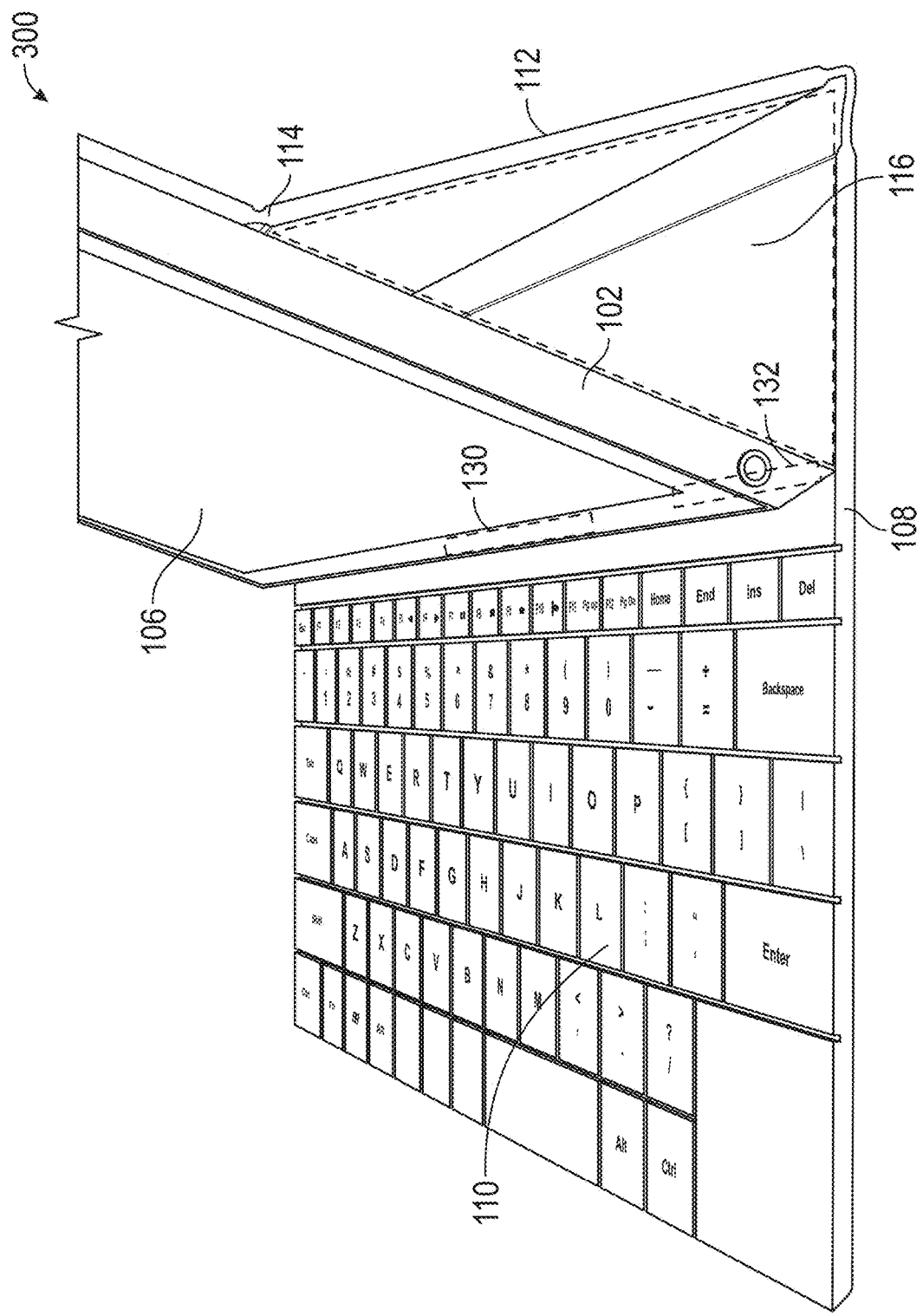
FIG. 3 illustrates one embodiment of a third system.

FIG. 3 illustrates one embodiment of a system 300. The system 300 may comprise a hybrid computing device 300 that may be the same or similar to hybrid computing device 100 of FIG. 1 and/or hybrid computing device 200 of FIG. 2 where like elements are similarly numbered. In various embodiments, FIG. 3 may illustrate a side perspective view of computing device 300 which more clearly illustrates the triangular stand 116. As shown in FIG. 3, the triangular stand 116 may be formed by a portion of the second portion 112 that pivots or rotates from seam 114, a portion of the first portion 108 behind a point where enclosure 102 rests on first portion 108 in a direction away from input device 110, and a portion of a back of enclosure 102. The arrangement may allow for triangular stand 116 to support the weight of enclosure 102 such that the hybrid computing device 300 can maintain the open configuration. The embodiments are not limited in this respect.

In some embodiments, the first portion 108 may have or include at least one integrated magnet 130 arranged to adjustably couple the first portion 108 of the cover 104 to a second side 126 of the enclosure 102 opposite the first side 124 in an open configuration as shown in FIGS. 1-3. For example, the one or more magnets 130 may be arranged to magnetically secure enclosure 102 in the open configuration shown in FIGS. 1-3. In some embodiments, the enclosure may comprise or include magnetic material along the second side 126 that allows the enclosure to be drawn towards and easily aligned with the magnets 130, ensuring a consistent and user friendly arrangement of the hybrid computing device 300. In various embodiments, multiple parallel rows of magnets 130 may be incorporated into first portion to allow for multiple angles of display 106 with respect to input device 110. Other embodiments are described and claimed.

In various embodiments, the first portion 108 may include or have one or more grooves or ribs 132 arranged to adjustably couple the first portion 108 of the cover 104 to a second side 126 of the enclosure 102 opposite the first side 120 in an open configuration as shown in FIGS. 1-3. For example, the one or more grooves or ribs 132 integrated may be arranged to receive or secure an edge of enclosure 102 to secure enclosure 102 in the open configuration shown in FIGS. 1-3. In some embodiments, the one or more grooves or ribs 132 integrated may be arranged to couple with an edge on the second side 126 of enclosure 102 to ensure a consistent and user friendly arrangement of the hybrid computing device 300. In various embodiments, multiple parallel rows of grooves or ribs 132 integrated may be incorporated into first portion to allow for multiple angles of display 106 with respect to input device 110. Other embodiments are described and claimed.

In various embodiments, the one or more magnets 130 and/or one or more grooves or ribs 132 may assist in prevent the enclosure 102 from sliding in a direction of the input device 110 in the open configuration. The placement of the one or more magnets 130 and/or one or more grooves or ribs 132 may also secure the second side 126 of the enclosure to the first portion 108, resulting in the weight of the enclosure 102 being supported by the triangular stand 116. The embodiments are not limited in this respect.

Figure 7:
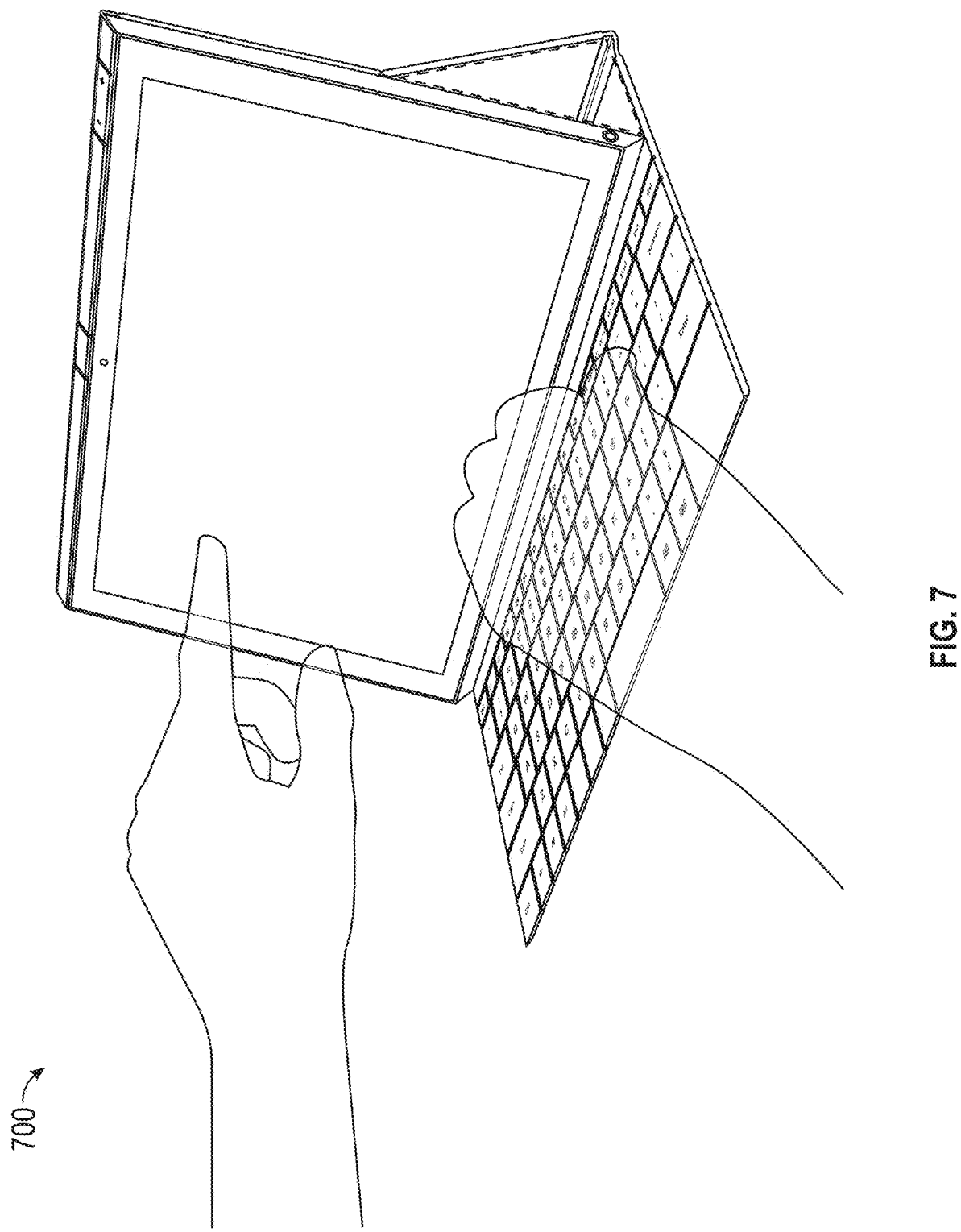
FIG. 7 illustrates one embodiment of a seventh system.

In various embodiments, the open clamshell or laptop configuration described in FIGS. 1-3 may allow a user to interact with the hybrid computing device as shown in one example in FIG. 7. As shown in FIG. 7, a may be able to interact with the touch-sensitive display 106 and also to control the device 100 or enter data using the input device 110 in the open configuration. Other embodiments are described and claimed.

Figure 4:
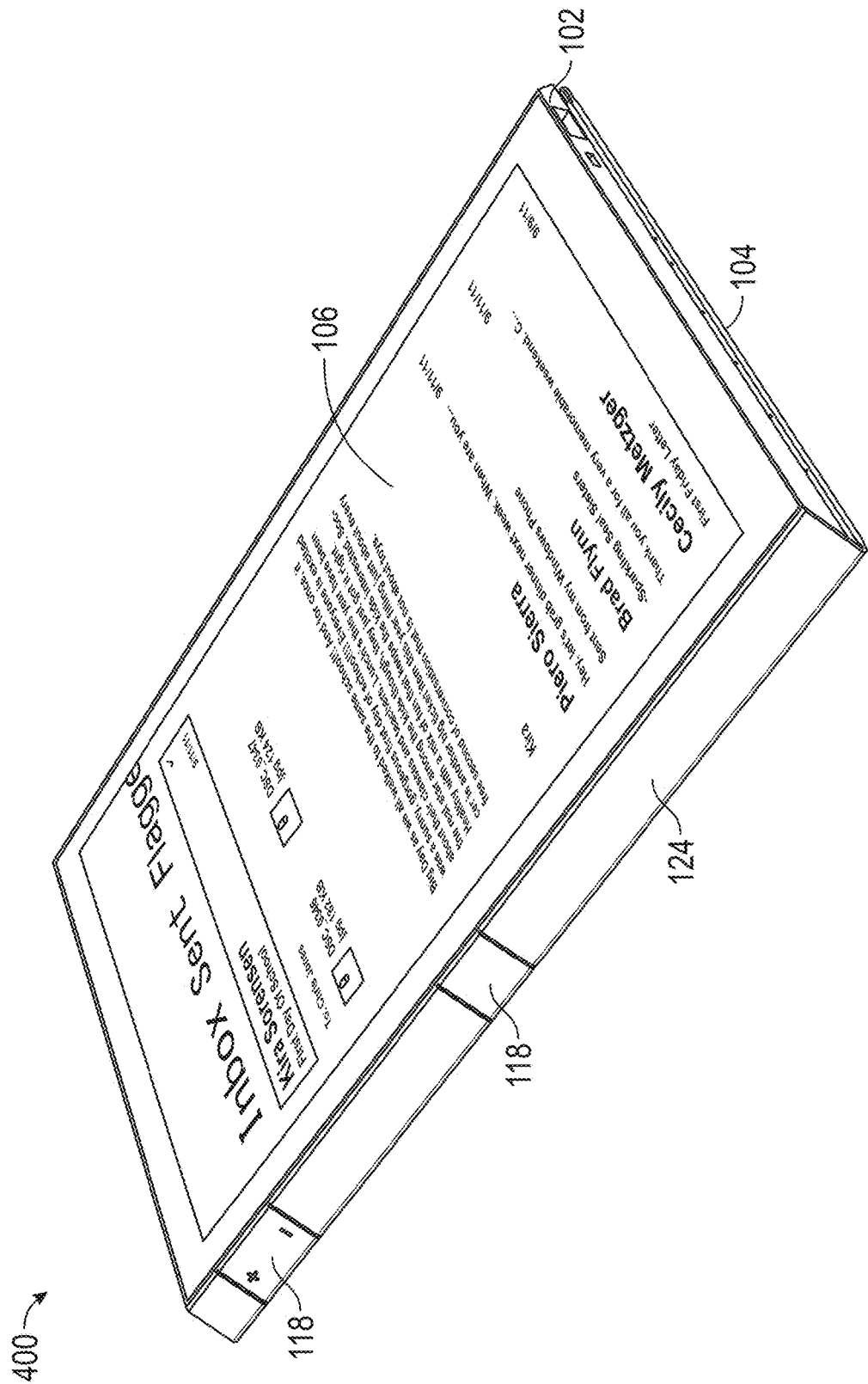
FIG. 4 illustrates one embodiment of a fourth system.
Figure 8:
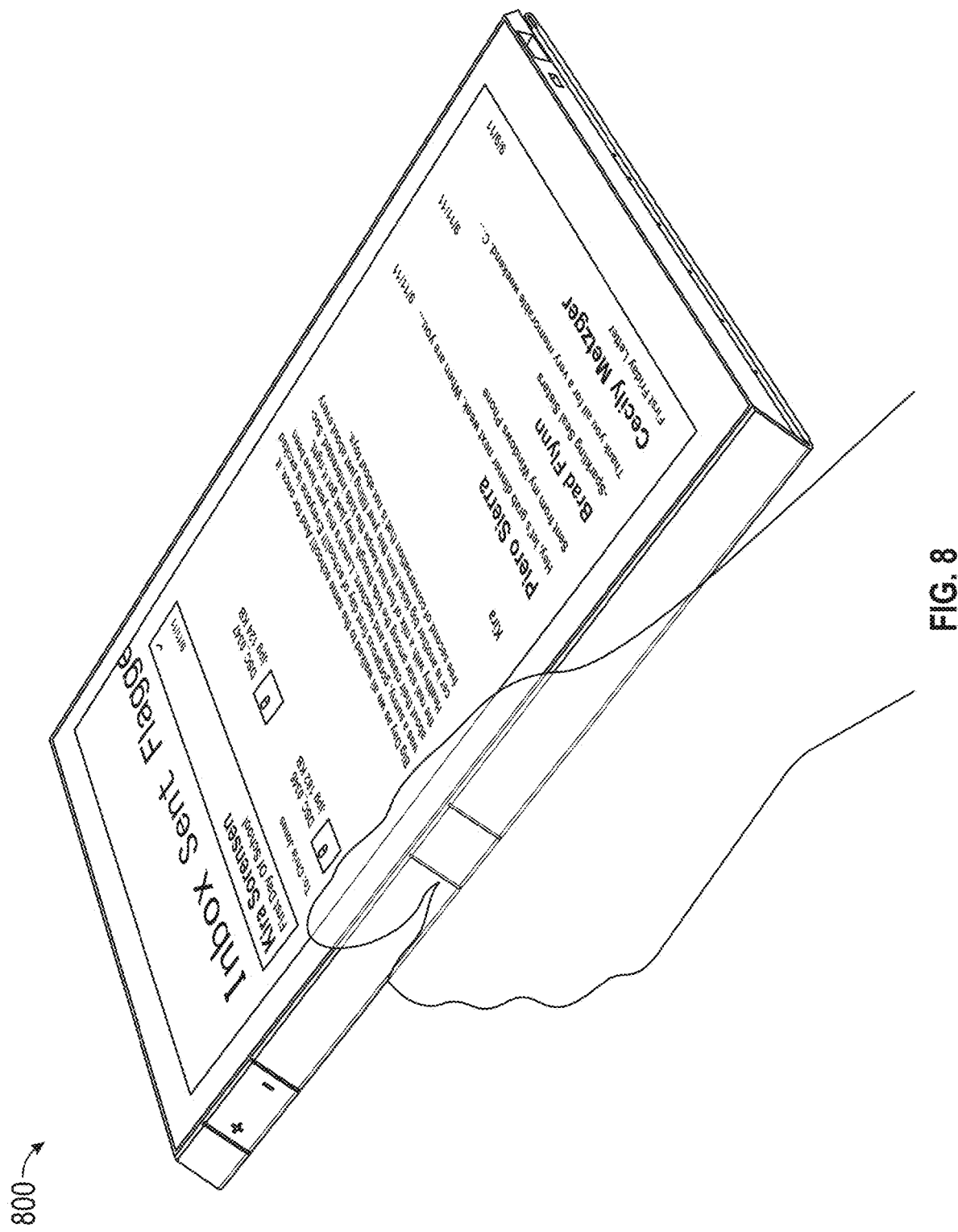
FIG. 8 illustrates one embodiment of an eighth system.

FIG. 4 illustrates one embodiment of a system 400. The system 400 may comprise a hybrid computing device 400 that may be the same or similar to hybrid computing device 100 of FIG. 1, 200 of FIGS. 2 and/or 300 of FIG. 3 where like elements are similarly numbered. In various embodiments, FIG. 4 may illustrate a front perspective view of computing device 400 in a first tablet configuration. As shown in FIG. 4, the first 108 and second 112 portions have been rotated around a back of the enclosure 102 and are arranged to align with the back of the enclosure 102 in the first tablet configuration. In some embodiments, the display 106 may be arranged to be accessible and operable in the first tablet configuration and the input device 110 may be arranged to be inaccessible and inoperable in the first tablet configuration. The first tablet configuration shown in FIG. 4 may allow a user to comfortably hold and interact with the hybrid computing device as they would with a tablet computing device or a book as shown in one example in FIG. 8.

As shown in FIG. 4, a first side 124 and a second side 126 of the enclosure 102 may be arranged at an angle in a direction from a back of the enclosure 102 to the front of the enclosure 102, resulting in the front of the enclosure 102 having a smaller surface area than the back. While the embodiments are not limited in this respect, the angled side portions may create side surfaces that are visible when using the device in a plurality of different modes, such as the first tablet configuration, allowing users to easily see buttons or interfaces arranged on the side portions. In other embodiments, the angled side portions may allow for easier arrangement of the device in the various configurations described herein, as well as providing an aesthetically appealing shape and appearance. The embodiments are not limited in this respect.

In various embodiments, the hybrid computing device 400 may include one or more integrated devices or one or more input/output (I/O) ports 118 arranged on a side 124/126 of enclosure 102. In some embodiments, the one or more integrated input devices 118 may comprise a volume rocker switch or a home button as shown in FIG. 4. For example, in some embodiments the computing device 400 may include only one button or switch that is discretely located on a side 124 of enclosure 102 as shown in FIG. 4. In various embodiments, the single button or switch may be operative to turn the computing device 400 on and off and may also control various other functionality, including operating as a home screen button. While not shown in detail in FIGS. 1-4, some embodiments may include one or more power adapter ports. Other embodiments are described and claimed.

In other embodiments, the one or more I/O ports 118 may be communicatively coupled to the one or more processor circuits to allow for communication with one or more peripheral devices coupled to the one or more I/O ports 118. In various embodiments, the one or more I/O ports 118 may comprise one or more of an Ethernet interface, a Universal Serial Bus (USB) interface, a Thunderbolt® interface, a DisplayPort interface, a MiniDisplayPort (mDP) interface, an audio interface and/or the like. While shown on side 124 in FIG. 4, it should be understood that the one or more integrated input devices or one or more I/O portions 118 could be arranged anywhere on enclosure 102 or cover 104 and still fall within the described embodiments. Other embodiments are described and claimed.

Figure 5:
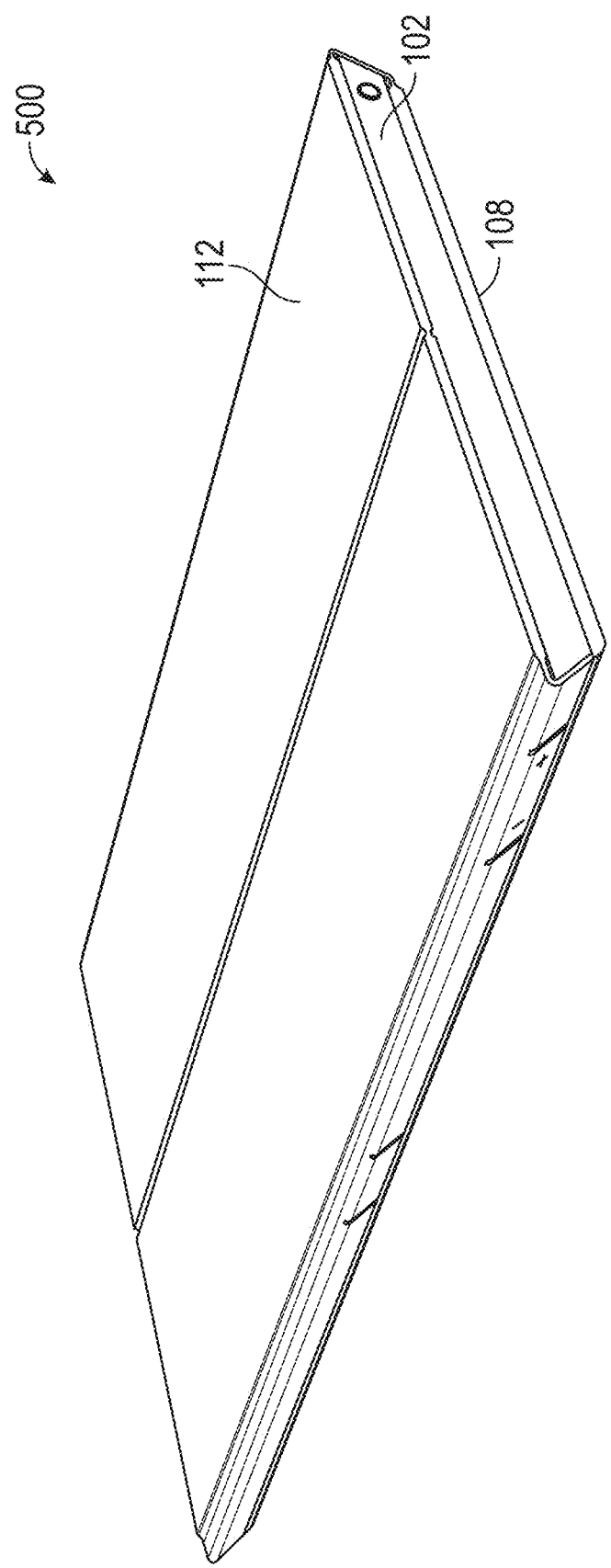
FIG. 5 illustrates one embodiment of a fifth system.

FIG. 5 illustrates one embodiment of a system 500. The system 500 may comprise a hybrid computing device 500 that may be the same or similar to hybrid computing device 100 of FIG. 1, 200 of FIG. 2, 300 of FIGS. 3 and/or 400 of FIG. 4 where like elements are similarly numbered. In various embodiments, FIG. 5 may illustrate a front perspective view of computing device 500 in a closed configuration. As shown in FIG. 5, the first portion 108 may be arranged to align with and conceal the display 106 or front of enclosure 102 of the computing device in the closed configuration. In some embodiments, the display 106 and the input device 110 may be arranged to be inaccessible and inoperable in the closed configuration.

In various embodiments, the closed configuration shown in FIG. 5 may provide protection for the hybrid computing device 500 when the device is not in use. The closed configuration shown in FIG. 5 may also provide for a compact and secure device design making the device easy to transport. For example, the first portion 108 may conceal and protect the display 106 when the device is placed in a computer bag or is otherwise transported or stored. The inoperability of the display 106 and the input device 110 in this configuration may occur as a result of the device 500 being placed in a sleep or inactive mode when in the closed configuration. In some embodiments, for example, the first portion 108 may include one or more magnets that align with magnets or other sensors or devices on the enclosure in the closed configuration, singling that the device may automatically be placed in the sleep mode. Conversely, the device 500 may be automatically placed in an active mode upon conversion from the closed configuration to any of the other configurations described herein. Other embodiments are described and claimed.

Figure 6:
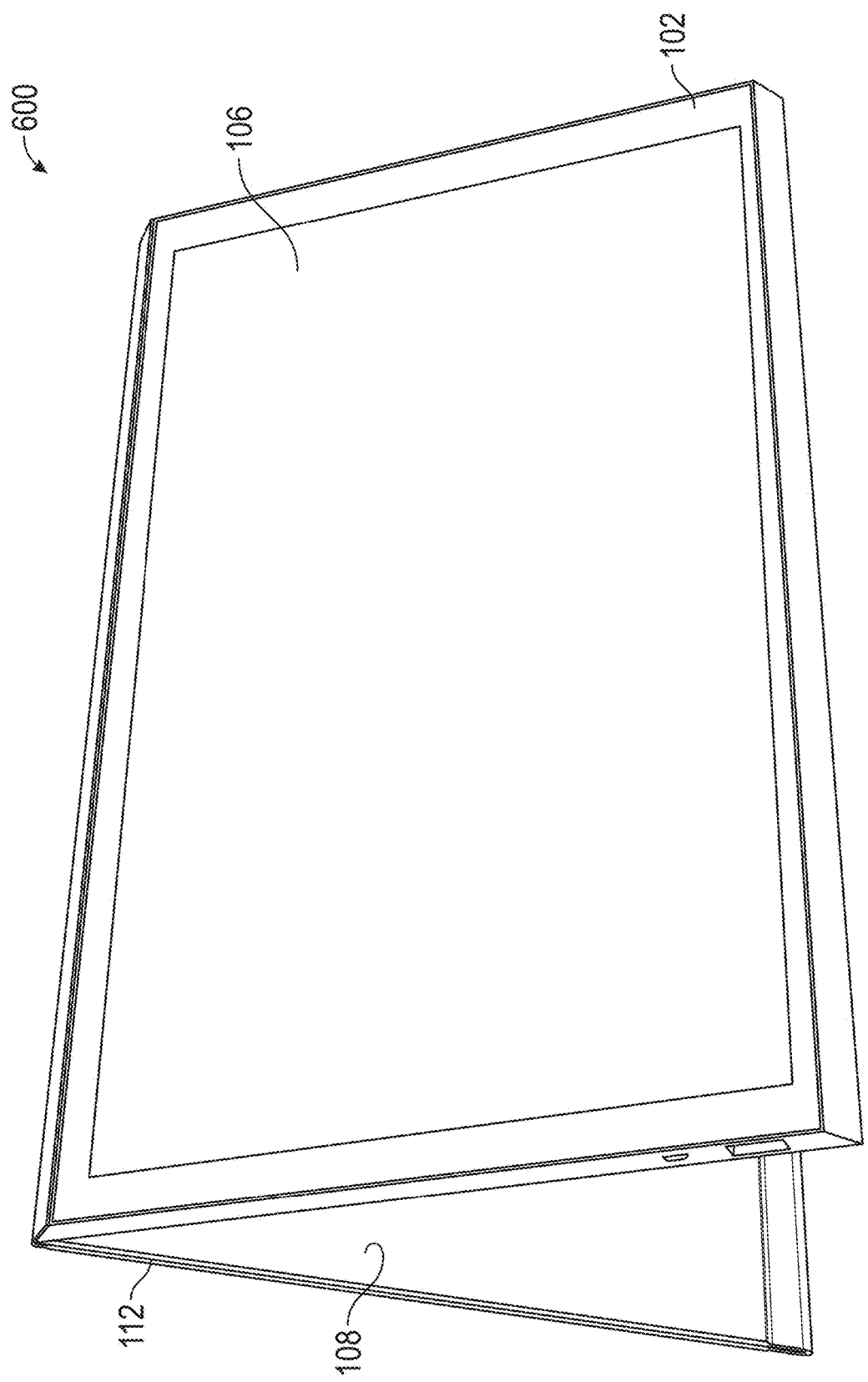
FIG. 6 illustrates one embodiment of a sixth diagram.

FIG. 6 illustrates one embodiment of a system 600. The system 600 may comprise a hybrid computing device 600 that may be the same or similar to hybrid computing device 100 of FIG. 1, 200 of FIG. 2, 300 of FIG. 3, 400 of FIGS. 4 and/or 500 of FIG. 5 where like elements are similarly numbered. In various embodiments, FIG. 6 may illustrate a front perspective view of computing device 600 in a second tablet or second clamshell configuration. As shown in FIG. 6, the first and second portions 108, 112 may be arranged to align with each other to support the enclosure 102 in the second tablet configuration. In some embodiments, for example, the second table configuration may comprise a movie mode configuration where both the first and second portions 108, 112 are concealed behind the enclosure to allow for full screen viewing of content.

In some embodiments, the first and second portions 108, 112 may be magnetically coupled to one another in the configuration shown in FIG. 6 and the portions 108, 112 may be arranged to prevent the seams 114 in the second portion from allowing the combined supporting mechanism created by the joined portions 108, 112 from folding or collapsing. For example, the first portion 108 may comprise a rigid structure that, when coupled to the second portion 112, supports the second portion in a rigid manner as shown in FIG. 6. Other embodiments are described and claimed.

Figure 9:
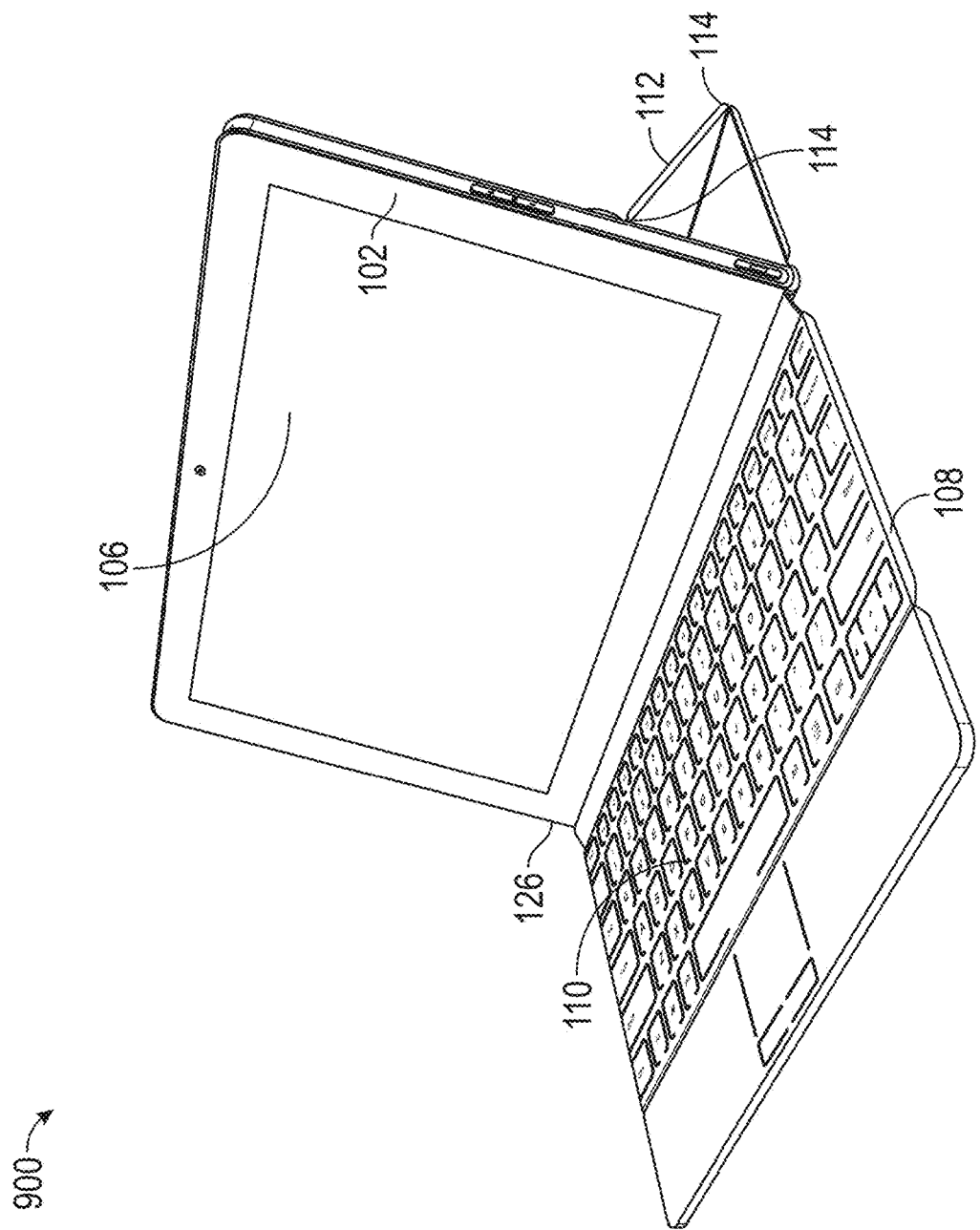
FIG. 9 illustrates one embodiment of a ninth system.

FIG. 9 illustrates one embodiment of a mobile computing device or system 900. In various embodiments, the mobile computing device 900 may comprise multiple nodes, elements or components and may be the same or similar to hybrid computing devices of FIGS. 1-8 where like elements are similarly numbered. In various embodiments, FIG. 9 may illustrate a front perspective view of computing device 900 in an open configuration. However, as shown in FIG. 9, computing device 900 may differ from the devices described with reference to FIGS. 1-8 in that the second side 126 of enclosure 102 may be mechanically coupled to cover 104 in the area of a pivotal coupled where the first portion 108 and second portion 112 of cover 104 come together and are coupled.

Figure 10:
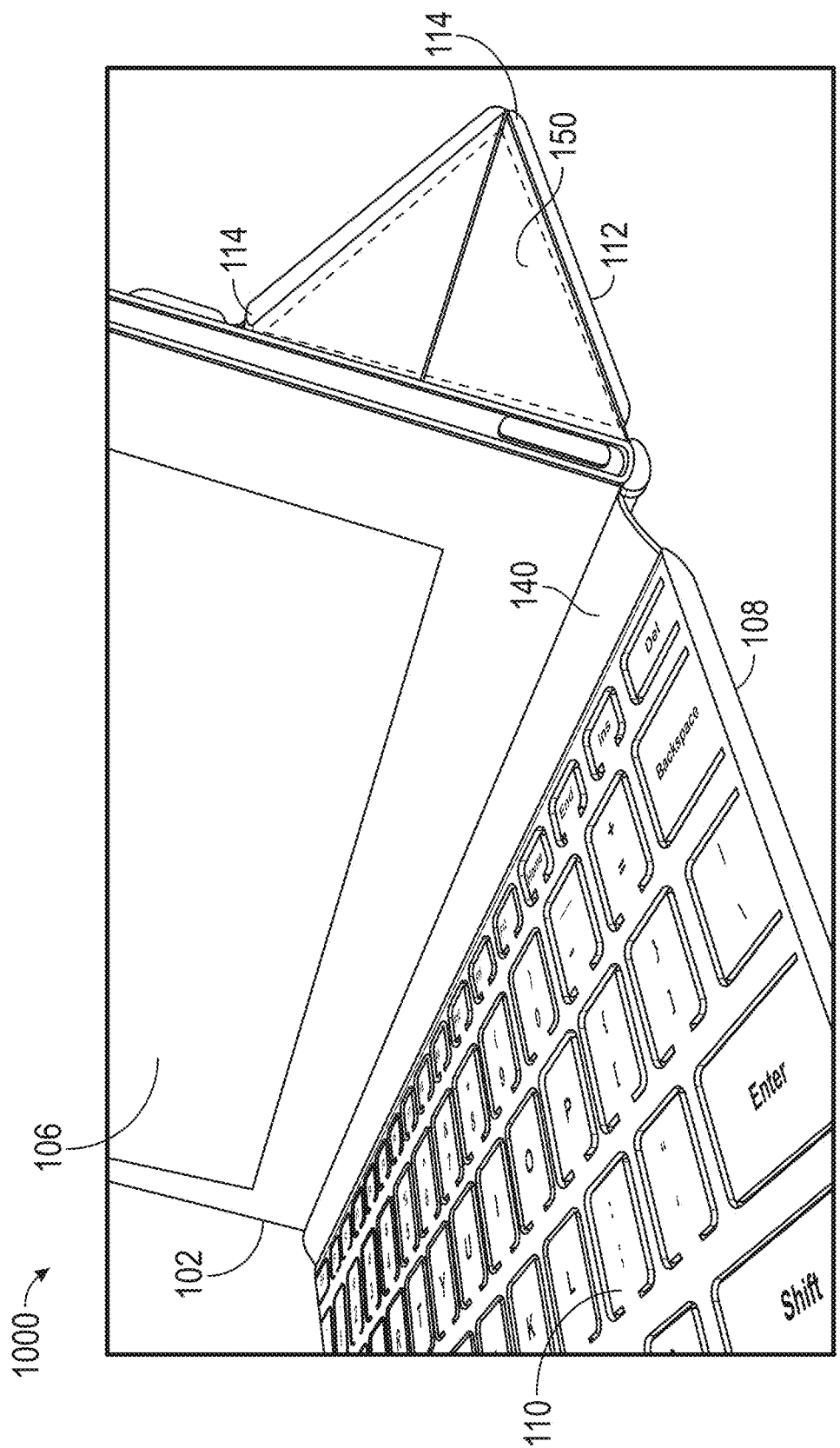
FIG. 10 illustrates one embodiment of a tenth system.

FIG. 10 illustrates one embodiment of a system 1000. The system 1000 may comprise a hybrid computing device 1000 that may be the same or similar to hybrid computing device 900 of FIG. 9 where like elements are similarly numbered. In various embodiments, FIG. 10 may illustrate a close up front perspective view of computing device 1000 in the open configuration. As shown in FIG. 10, second side 126 of enclosure 102 may be mechanically coupled to a flexible hinge 140 that is arranged to join the first portion 108 and the second portion 112 in some embodiments.

In various embodiments, the flexible hinge 140 may comprise a fabric hinge arranged to allow both the first and second portions 108, 112 to rotate freely around an axis defined by the junction of the second side 126 and the flexible hinge 140. In some embodiments, the first portion 108 may include a larger portion of the flexible hinge 140 to allow the first portion 108 to rotate to a position on the back of enclosure 102 as shown and described in more detail with reference to FIG. 14.

Figure 16:
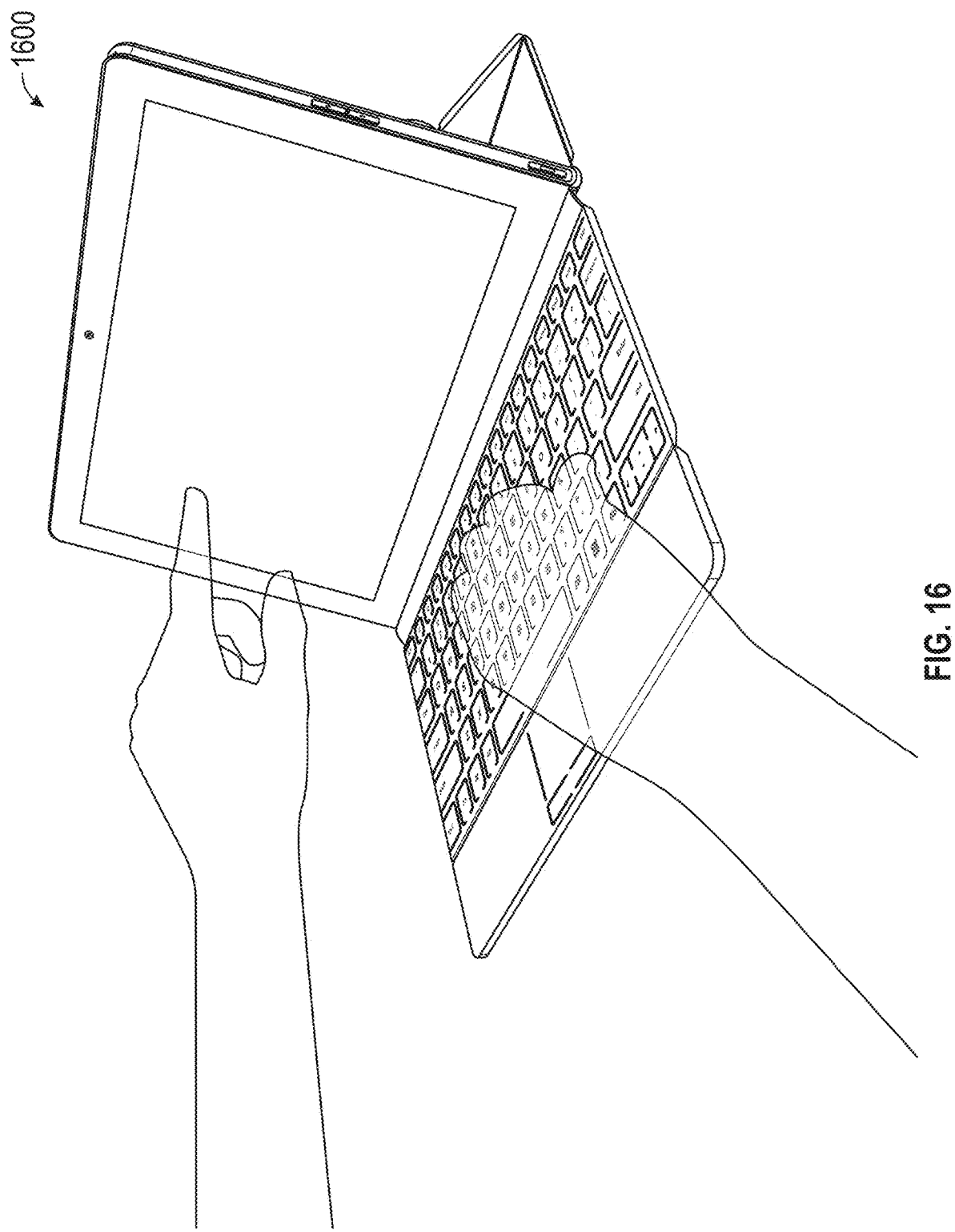
FIG. 16 illustrates one embodiment of a sixteenth system.

As shown in FIGS. 9 and 10, the hybrid computing device arranged in the open configuration may allow for both the input device 110 and the display 106 to be accessible and operable. For example, a user may be able to interact with the hybrid computing device as shown in one example in FIG. 16. As shown in FIG. 16, a user may be able to interact with the touch-sensitive display 106 and also to control the device 900, 1000 or enter data using the input device 110 in the open configuration. Other embodiments are described and claimed.

In some embodiments, a triangular stand 150 may be formed using the second portion 112 to support enclosure 102 in the open configuration. In various embodiments, the second portion 112 may have or include two or more flexible seams 114 arranged to allow the second portion 112 to adjustably pivot around the seams to form the triangular stand 150 to support the enclosure 102 in the open configuration.

Figure 11:
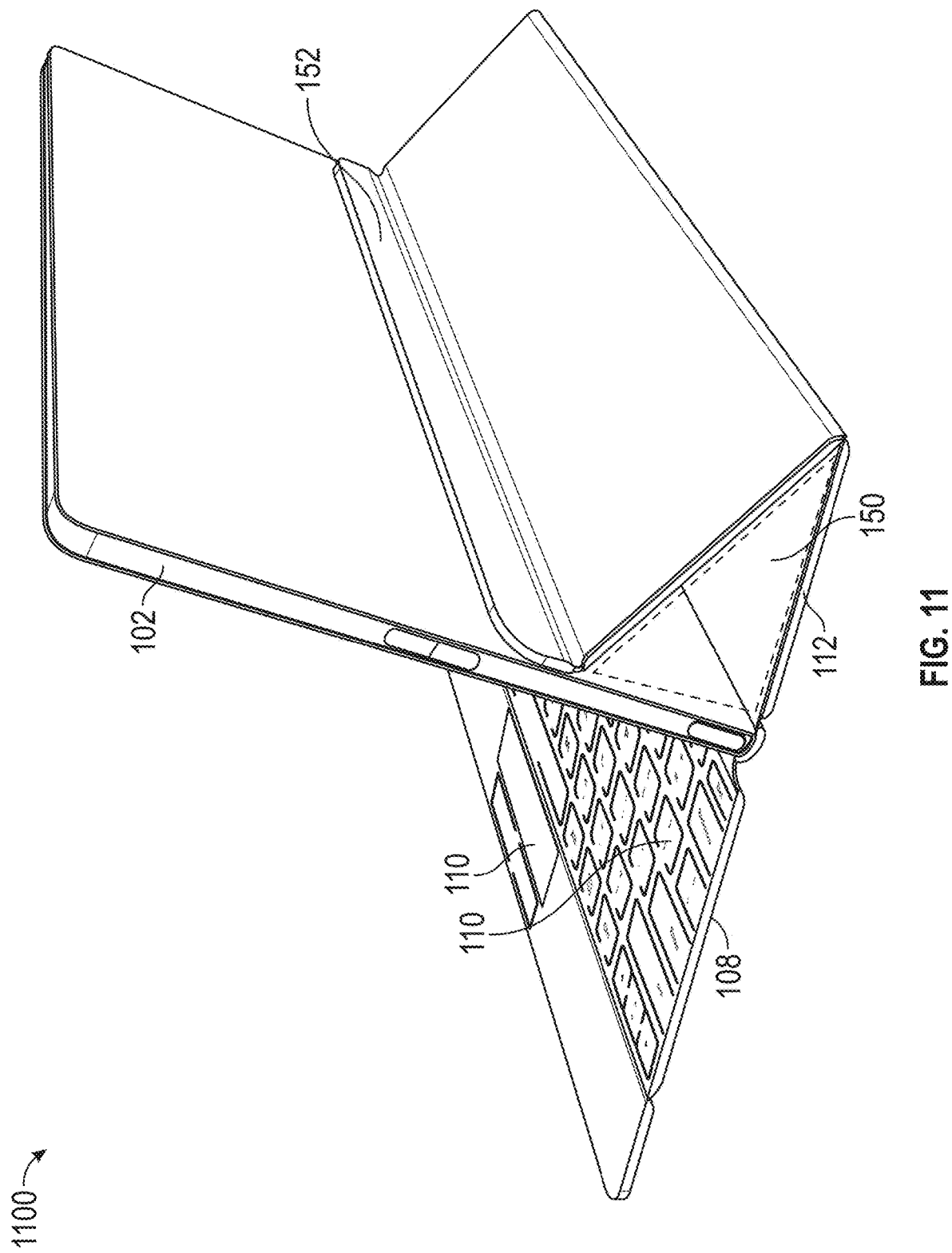
FIG. 11 illustrates one embodiment of an eleventh system.

FIG. 11 illustrates one embodiment of a system 1100. The system 1100 may comprise a hybrid computing device 1100 that may be the same or similar to hybrid computing device 900 of FIG. 9 or 1000 of FIG. 10 where like elements are similarly numbered. In various embodiments, FIG. 11 may illustrate a back perspective view of computing device 1100 in the open configuration. As shown in FIG. 11, the triangular stand 150, while similar in nature and function to triangular stand 116, may be formed or arranged differently based on the different attachment point of the enclosure 102 to cover 104.

In some embodiments, second portion 112 of the cover 104 may have or include at least two seams 114 that together help to form the triangular stand 150 and also allow for a flap 152 that may be arranged to adjustably couple to the back of enclosure 102. For example, the flap 152 may include or comprise at least one integrated magnet arranged to adjustably couple the flap portion 152 of the cover 104 to one or more magnetic portions of the back of the enclosure 102. In this manner, the flap 152 may be attached to different portion of the back of enclosure 102, thereby adjusting the angle of display 106 with respect to input device 110. Other embodiments are described and claimed.

Figure 12:
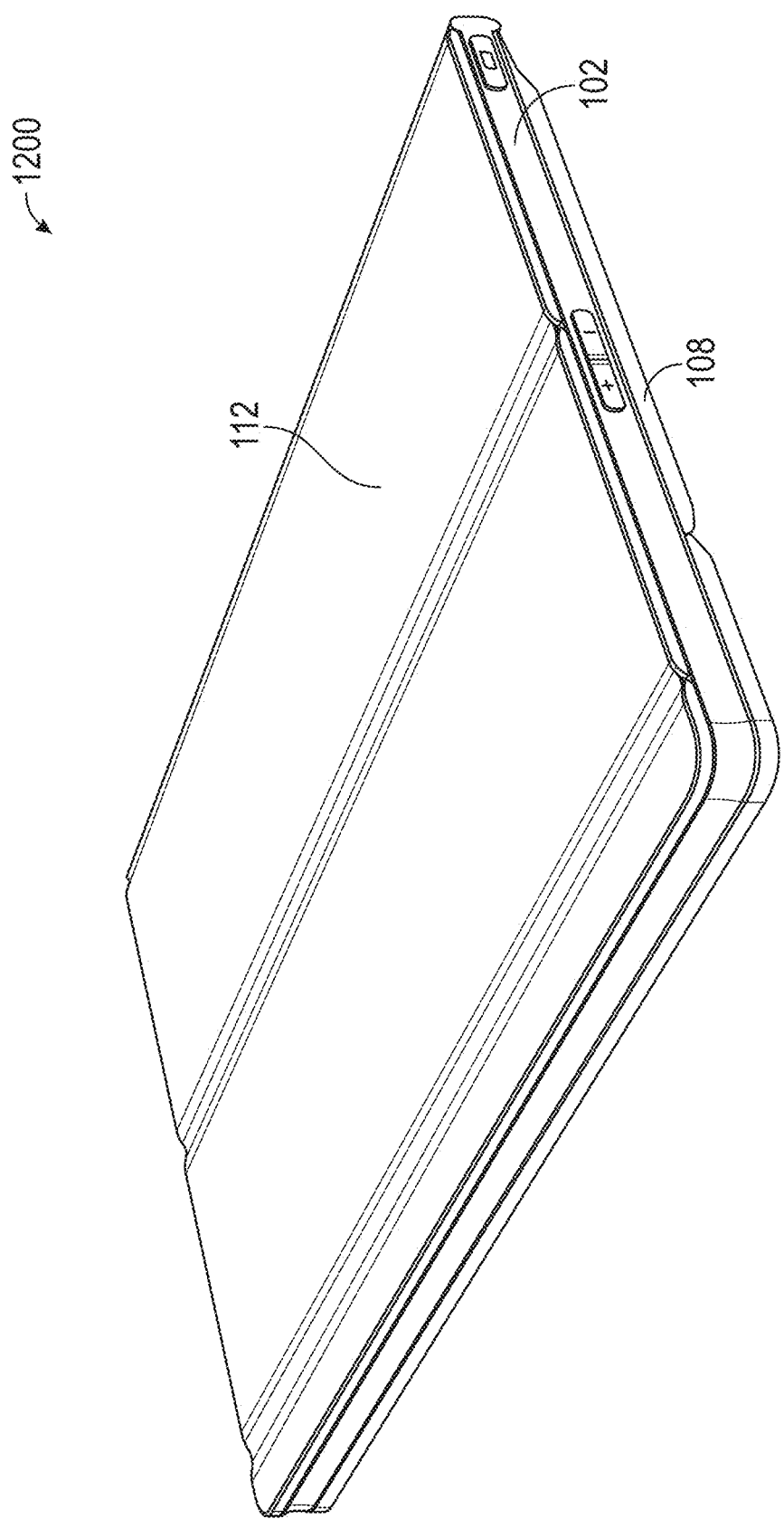
FIG. 12 illustrates one embodiment of a twelfth system.

FIG. 12 illustrates one embodiment of a system 1200. The system 1200 may comprise a hybrid computing device 1200 that may be the same or similar to hybrid computing device 900 of FIG. 9, 1000 of FIGS. 10 and/or 1100 of FIG. 11 where like elements are similarly numbered. In various embodiments, FIG. 12 may illustrate a front perspective view of computing device 1200 in a closed configuration. As shown in FIG. 12, the first portion 108 may be arranged to align with and conceal the display 106 of the computing device in a closed configuration. In this configuration, the display 106 and the input device 110 may be arranged to be inaccessible and inoperable. In the closed configuration, in various embodiments, the second portion 112 may align with and substantially conceal the back of enclosure 102. Together, the first and second portions 108, 112 may protect and substantially cover enclosure 102 in the closed configuration. Other embodiments are described and claimed.

In various embodiments, the first portion 108 may have or include one or more flexible seams 114 that may be the same or similar to the flexible seams 114 of the second portion 112. In some embodiments, the one or more flexible seams 114 of the first portion 108 may be arranged to allow the first portion to adjustably pivot around the seams 114. For example, as shown in FIG. 13, a fractional portion or flap 160 of the first portion 108 may be arranged to rotate around the one or more seams 114 to reveal a portion 162 of the display 106 in or from a partially closed configuration.

Figure 13:
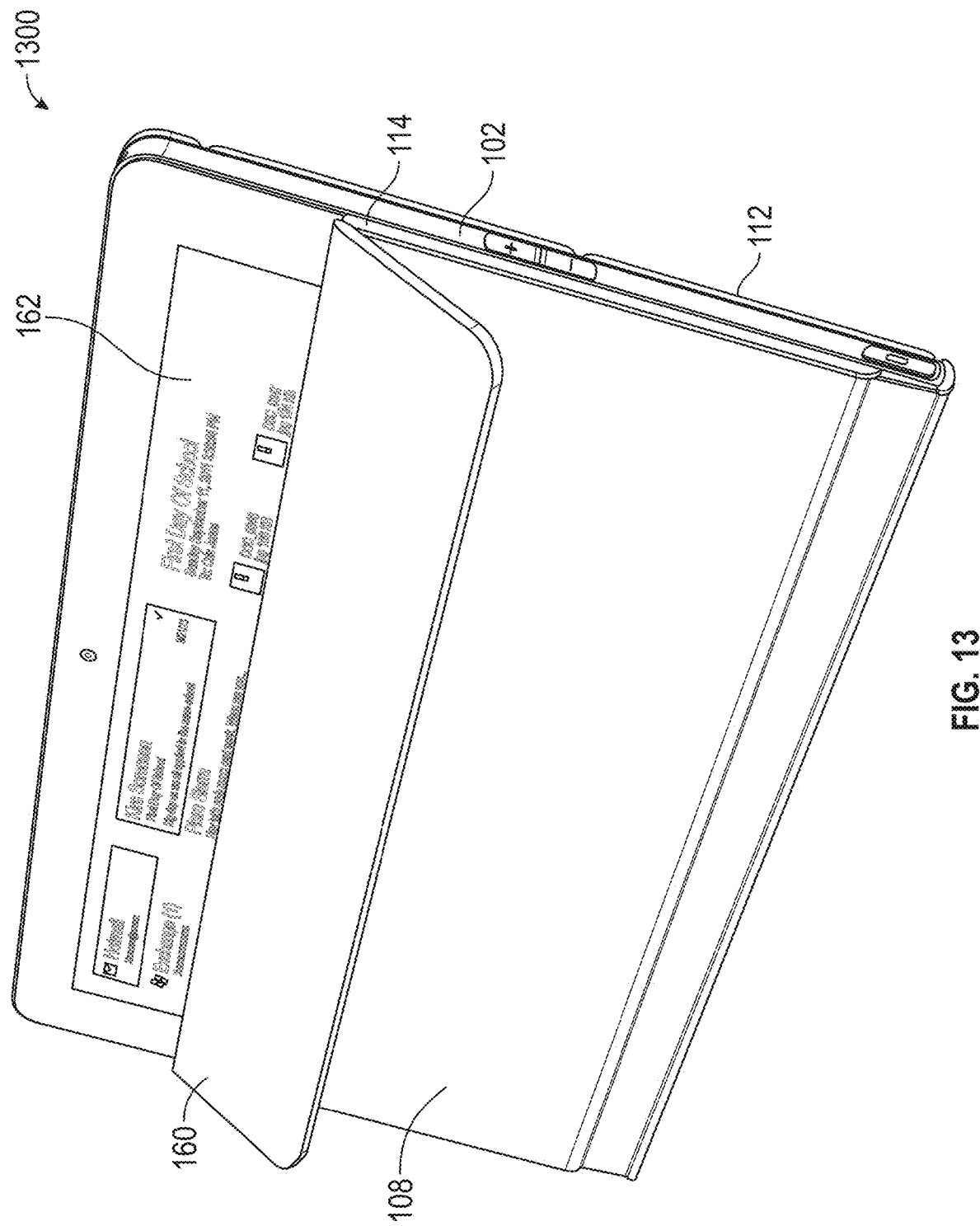
FIG. 13 illustrates one embodiment of a thirteenth system.

In some embodiments, the computing device 1300 of FIG. 13, which may be the same or similar to hybrid computing device 900 of FIG. 9, 1000 of FIG. 10, 1100 of FIGS. 11 and/or 1200 of FIG. 12 where like elements are similarly numbered, may be operable to display one or more graphical user interface elements on the revealed portion 162 of the display 106. In some embodiments, the flap 160 may include one or more magnets or other sensor that correspond to and align with magnets or sensor on enclosure 102. When the flap 160 is moved away from enclosure 102 as shown in FIG. 13, computing device 1300 may be operable to sense that only a portion 162 of display 106 has been revealed, therein formatting a limited amount of data in the form of one or more graphical user interface elements to be displayed on the portion 162 of display 106. For example, responsive to a user rotating the flap 160 away from enclosure 102 to reveal portion 162 of display 106, computing device 1300 may be operative to format and display a summary of information that may be of interest to the user in only the portion 162. The information may include but is not limited to missed calls or messages, email summaries, weather, appointments from a calendar application or any other suitable information. Providing for this type of summary in response to the flap 160 being rotated to reveal portion 162 may allow for users to quickly obtain important information without having to completely open and activate device 1300. Other embodiments are described and claimed.

Figure 14:
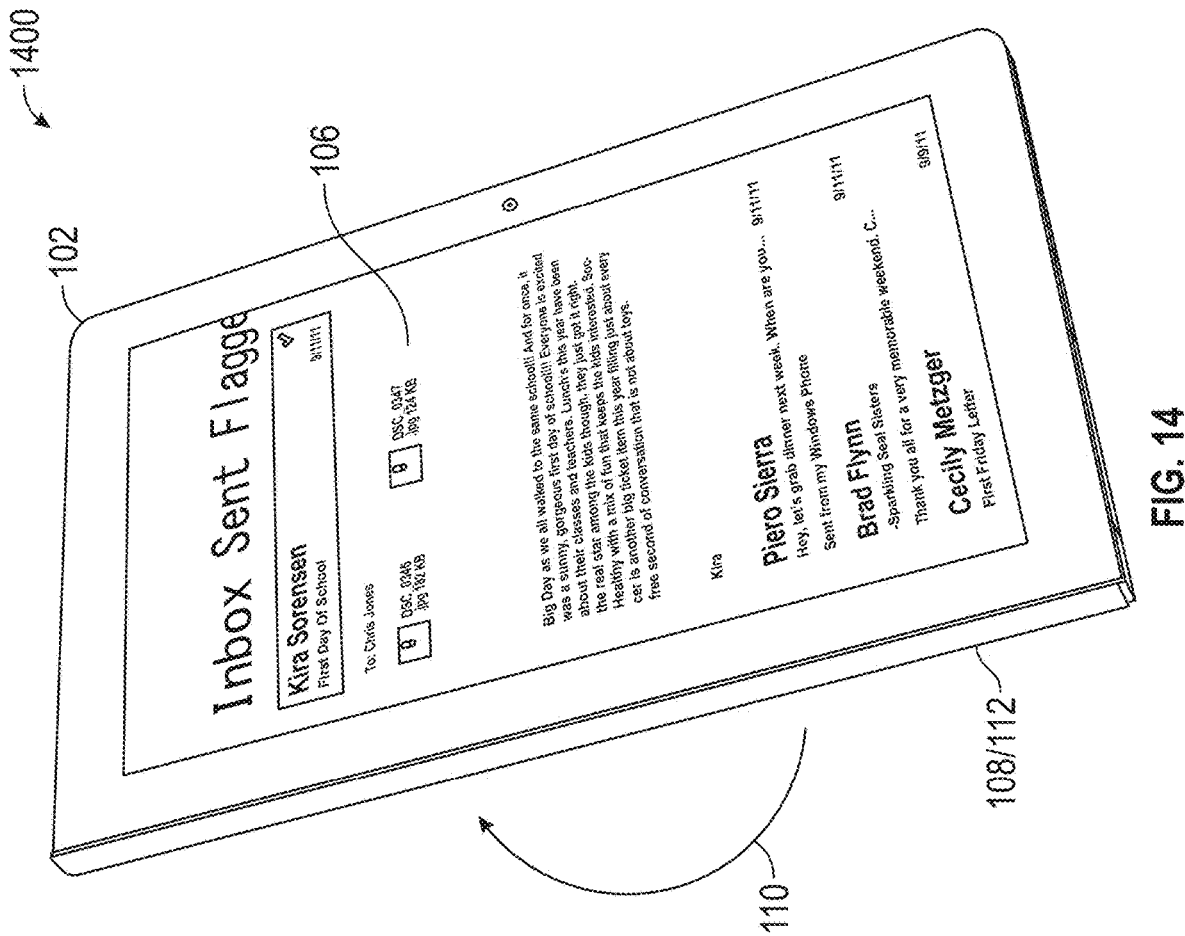
FIG. 14 illustrates one embodiment of a fourteenth system.

FIG. 14 illustrates one embodiment of a system 1400. The system 1400 may comprise a hybrid computing device 1400 that may be the same or similar to hybrid computing device 900 of FIG. 9, 1000 of FIG. 10, 1100 of FIG. 11, 1200 of FIGS. 12 and/or 1300 of FIG. 13 where like elements are similarly numbered. In various embodiments, FIG. 14 may illustrate a front perspective view of computing device 1400 in a first tablet configuration. As shown in FIG. 14, the first and second portions 108 and 112 may be arranged to align with a back of the enclosure 102 in the first tablet configuration.

In the table configuration shown in FIG. 14, the display 106 may be arranged to be accessible and operable and the input device 110 may be arranged to be accessible and inoperable in the first tablet configuration. This differs from the computing device described with reference to FIGS. 1-8. By way of contract, the computing device of FIGS. 1-8 allowed for the input device 110 to be stowed away and hidden in the first tablet configuration. In various embodiments, because the second side 126 of enclosure 102 is attached to cover 104 in the computing device 1400, the input device 110 may be accessible on the back of enclosure 102 in the first tablet configuration. As a result, it may be advantageous to render the input device 110 inoperable in various embodiments. In some embodiments, the input device 110 may remain operable to allow for input or control of the computing device 1400 in the first tablet configuration. The embodiments are not limited in this respect.

Figure 17:
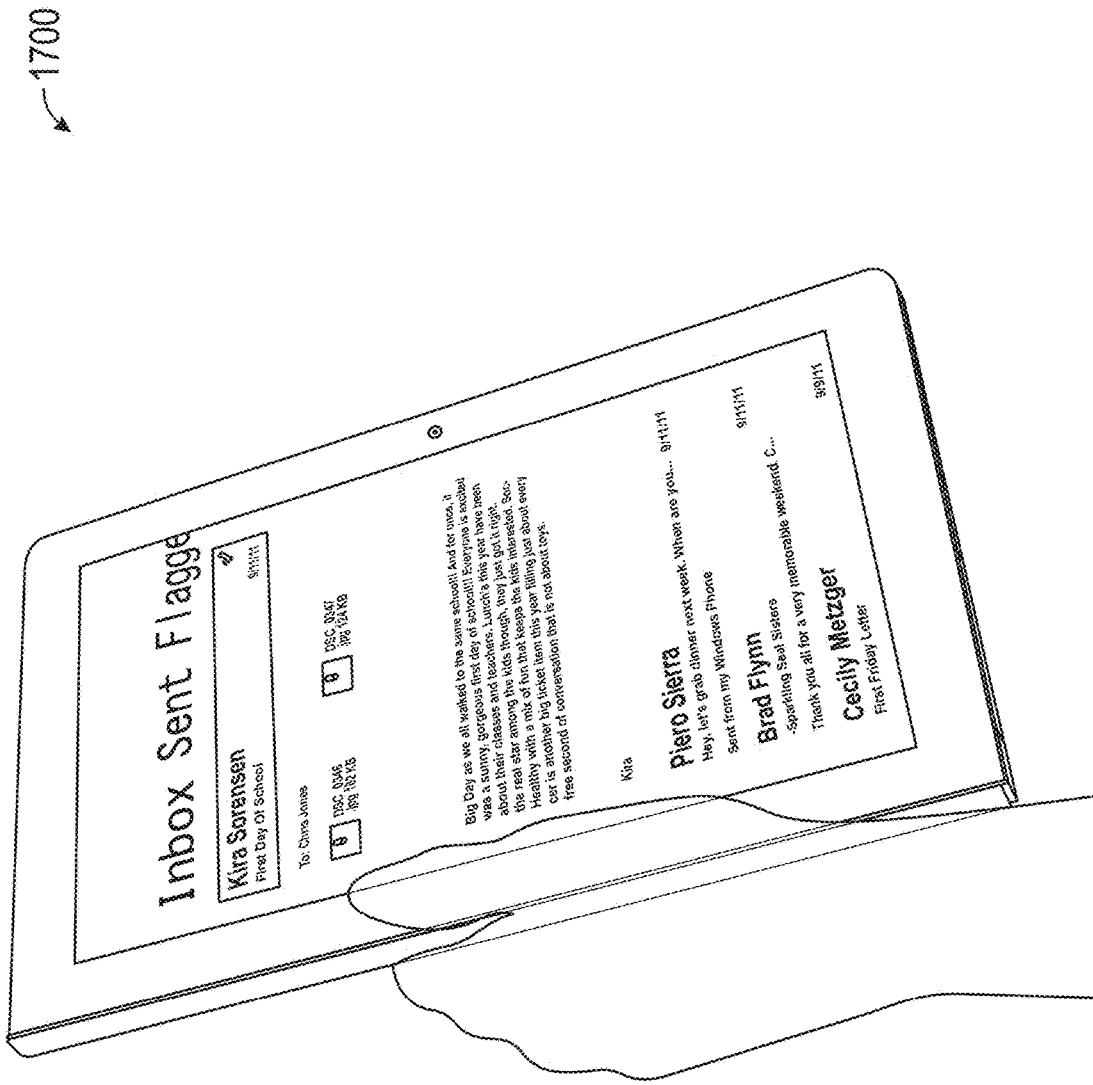
FIG. 17 illustrates one embodiment of a seventeenth system.

As shown in FIG. 14, the hybrid computing device 1400 arranged in the first tablet configuration may allow for the display 106 to be accessible and operable. For example, a user may be able to interact with the hybrid computing device as shown in one example in FIG. 17. As shown in FIG. 17, a user may be able to interact with the touch-sensitive display 106 in the first tablet configuration. Other embodiments are described and claimed.

Figure 15:
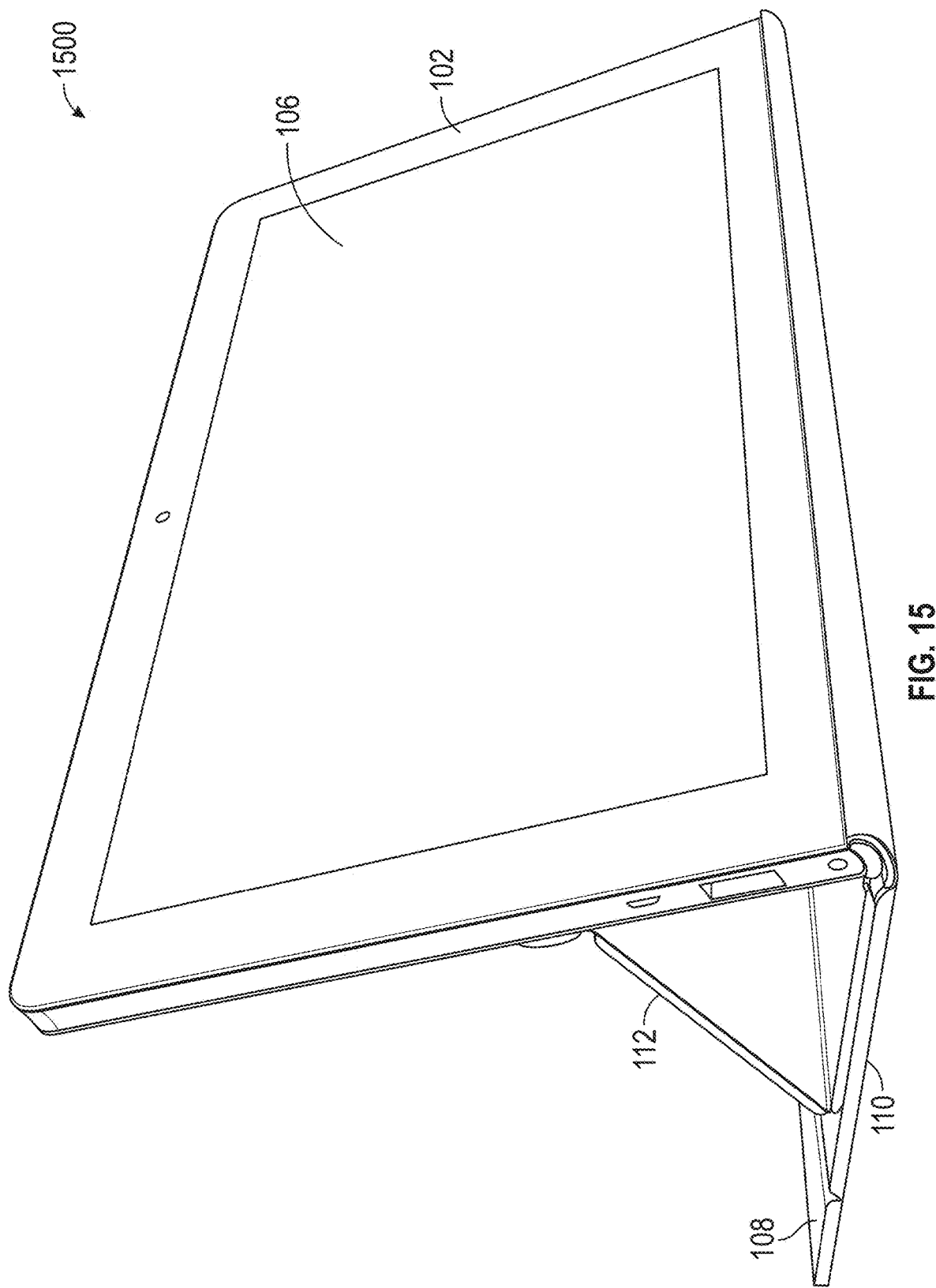
FIG. 15 illustrates one embodiment of a fifteenth system.

FIG. 15 illustrates one embodiment of a system 1500. The system 1500 may comprise a hybrid computing device 1500 that may be the same or similar to hybrid computing device 900 of FIG. 9, 1000 of FIG. 10, 1100 of FIG. 11, 1200 of FIG. 12, 1300 of FIGS. 13 and/or 1400 of FIG. 14 where like elements are similarly numbered. In various embodiments, FIG. 15 may illustrate a front perspective view of computing device 1400 in a second tablet configuration or a second clamshell configuration. As shown in FIG. 14, the second portion 112 may be arranged to allow the second portion 112 to adjustably pivot around the two or more seams 114 to form a triangular stand 150 to support the enclosure 102 in some embodiments.

In some embodiments, the triangular stand 150 may be the same or similar to that described above with reference to the open configuration in FIGS. 9-11. In various embodiments, the triangular stand 150 may additionally be arranged to restrict rotation of the first portion 108 when the first portion 108 is arranged to align with a portion of the triangular stand 150 in a second tablet configuration or second open configuration as shown in FIG. 15. In the embodiments shown in FIG. 15, the first portion 108 and second portion may together form a stand that allows for full screen viewing of the computing device 1500. In these embodiments, the input device 110 may be arranged to be inaccessible and inoperable because the device may rest, for example, on a table top or on the lap of a user. Other embodiments are descried and claimed.

Figure 18:
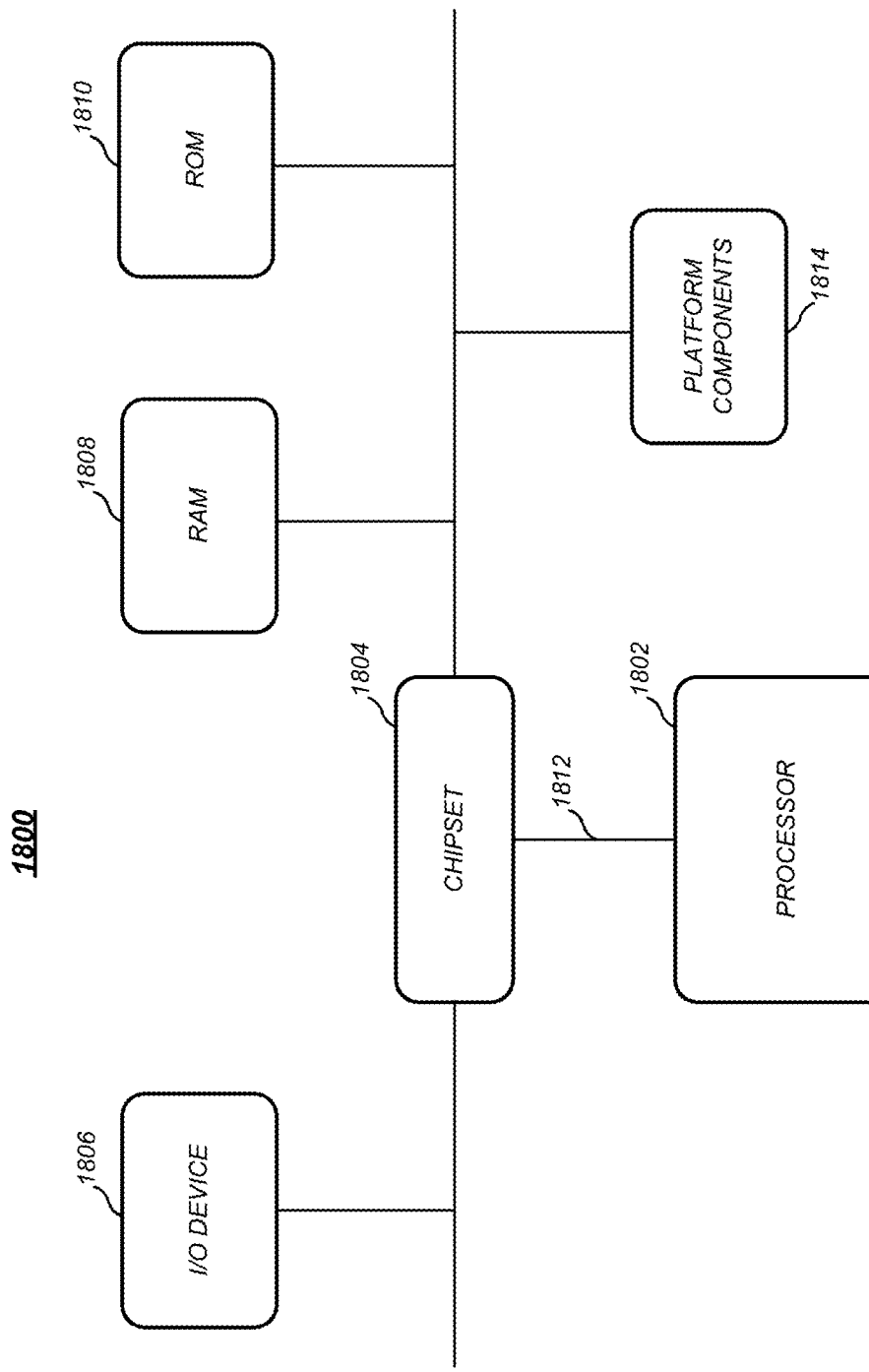
FIG. 18 illustrates one embodiment of an eighteenth system.

FIG. 18 is a diagram of an exemplary system embodiment. In particular, FIG. 18 is a diagram showing a system 1800, which may include various elements and may be the same or similar to the computing devices described with reference to FIGS. 1-17. For instance, FIG. 18 shows that system 1800 may include a processor 1802, a chipset 1804, an input/output (I/O) device 1806, a random access memory (RAM) (such as dynamic RAM (DRAM)) 1808, and a read only memory (ROM) 1810, and various platform components 1814 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 18, I/O device 1806, RAM 1808, and ROM 1810 are coupled to processor 1802 by way of chipset 1804. Chipset 1804 may be coupled to processor 1802 by a bus 1812. Accordingly, bus 1812 may include multiple lines.

Processor 1802 may be a central processing unit comprising one or more processor cores and may include any number of processors having any number of processor cores. The processor 1802 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1800 may include various interface circuits, such as an Ethernet interface and/or a Universal Serial Bus (USB) interface, and/or the like. In some exemplary embodiments, the I/O device 1806 may comprise one or more input devices connected to interface circuits for entering data and commands into the system 1800. For example, the input devices may include a keyboard (physical or virtual/soft), mouse, touch screen, track pad, track ball, isopoint, a voice recognition system, and/or the like. Similarly, the I/O device 1806 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1800 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

In various embodiments, the system 1800 may comprise or be included in a hybrid computing device that includes an enclosure arranged to support a display on a front of the enclosure and a cover mechanically coupled to a side of the enclosure, the cover comprising a first portion having at least one integrated input device and a second portion having at least one flexible seam arranged to allow the second portion to adjustably pivot around the seam. In some embodiments, the second portion may be arranged to form a triangular stand to support the enclosure in an open configuration and the display and the input device may be arranged to be accessible and operable in the open configuration.

In some embodiments, the first portion may be arranged to align with and conceal the display of the computing device in a closed configuration and the display and the input device may be arranged to be inaccessible and inoperable in the closed configuration. In other embodiments, the first and second portions may be arranged to align with a back of the enclosure opposite the front of the enclosure in a first tablet configuration and the display may be arranged to be accessible and operable in the first tablet configuration.

A first end of the second portion of the cover may be mechanically coupled to a first side of the enclosure and a second end of the second portion opposite the first end may be pivotally coupled to the first portion in some embodiments. In various embodiments, the first portion may have at least one integrated magnet arranged to adjustably couple the first portion of the cover to a second side of the enclosure opposite the first side in an open configuration. In additional or alternative embodiments, the first portion may have one or more grooves or ribs arranged to adjustably couple the first portion of the cover to a second side of the enclosure opposite the first side in an open configuration.

In various embodiments, the first and second portions may be arranged to align with the back of the enclosure in a first tablet configuration and the display may be arranged to be accessible and operable in the first tablet configuration and the input device may be arranged to be inaccessible and inoperable in the first tablet configuration. The first and second portions may be arranged to align with each other to support the enclosure in a second tablet configuration in some embodiments.

In some embodiments, a first side and a second side of the enclosure may be arranged at an angle in a direction from a back of the enclosure to the front of the enclosure, the front having a smaller surface area than the back. A second side of the enclosure may be mechanically coupled to the cover at a pivotal coupling of the first and second portions of the cover in various embodiments. In some embodiments, the second portion may have two or more flexible seams arranged to allow the second portion to adjustably pivot around the seams to form a triangular stand to support the enclosure in an open configuration.

The second portion of the cover may have at least one integrated magnet arranged to adjustably couple a portion of the cover to a back of the enclosure in some embodiments. In various embodiments, the first and second portions may be arranged to align with a back of the enclosure in a first tablet configuration and the display may be arranged to be accessible and operable in the first tablet configuration and the input device may be arranged to be accessible and inoperable in the first tablet configuration. In other embodiments, the second portion may have two or more flexible seams arranged to allow the second portion to adjustably pivot around the two or more seams to form a triangular stand to support the enclosure and to restrict rotation of the first portion when the first portion is arranged to align with a portion of the triangular stand in a second tablet configuration.

In various embodiments, the first portion may have one or more flexible seams arranged to allow the first portion to adjustably pivot around the seams and the first portion may be arranged to align with and conceal the display of the computing device in a closed configuration, the display and the input device may be arranged to be inaccessible and inoperable in the closed configuration. In these embodiments, the first portion may be arranged to rotate around the one or more seams to reveal a portion of the display in the closed configuration and the computing device may be operable to display one or more graphical user interface elements on the revealed portion of the display.

In some embodiments, the system 1800 may include or comprise one or more integrated input devices arranged on a side of the enclosure, a display comprising a touch-sensitive display communicatively coupled to one or more processor circuits, one or more sensors comprising one or more of a camera, accelerometer, proximity sensor, light sensor, compass or global positioning system (GPS) or any other suitable component. In some embodiments, the system 1800 may additionally include one or more wireless transceivers operative to enable wireless communications for the computing device using one or more wireless communication protocols. Other embodiments are described and claimed.

In some embodiments, the system 1800 may comprise or include a hybrid computing device referred to hereinafter as the folio device. The folio device may include or comprise an enclosure arranged to support a display on a front of the enclosure and a cover comprising a first portion pivotally coupled to a second portion in some embodiments. In various embodiments, the first portion may have at least one integrated input device and the second portion may have at least one flexible seam arranged to allow the second portion to adjustably pivot around the seam. In some embodiments, a first side of the enclosure may be mechanically coupled to a first end of the second portion opposite the pivotal coupling of the first portion and the second portion.

In various embodiments, the first portion may comprise a rigid structure arranged to support a keyboard and the second portion may be arranged to form a triangular stand to support the enclosure in an open configuration. In some embodiments, the display and the input device may be to be accessible and operable in the open configuration.

In some embodiments, the first portion may have at least one integrated magnet arranged to adjustably couple the first portion of the cover to a second side of the enclosure opposite the first side in an open configuration. In various embodiments, the first portion may have one or more grooves or ribs arranged to adjustably couple the first portion of the cover to a second side of the enclosure opposite the first side in an open configuration. In other embodiments, the first portion may be arranged to align with and conceal the display of the computing device in a closed configuration and the display and the input device may be arranged to be inaccessible and inoperable in the closed configuration.

In various embodiments, the first and second portions may be arranged to align with the back of the enclosure in a first tablet configuration and the display may be arranged to be accessible and operable in the first tablet configuration and the input device may be arranged to be inaccessible and inoperable in the first tablet configuration. In other embodiments, the first and second portions may be arranged to align with each other to support the enclosure in a second tablet configuration.

The folio device may additionally include, in some embodiments, one or more processor circuits, a touch sensitive display and/or one or more wireless transceivers operative to enable wireless communications for the computing device using one or more wireless communication protocols. Other embodiments are described and claimed.

In some embodiments, the system 1800 may comprise or include a hybrid computing device referred to hereinafter as the peek device. The peek device may include or comprise an enclosure arranged to support a display on a front of the enclosure and a cover comprising a first portion pivotally coupled to a second portion, the first portion having at least one integrated input device and at least one flexible seam and the second portion having two or more flexible seams, the flexible seams arranged to allow the first and second portions to adjustably pivot around the seams and a second side of the enclosure mechanically coupled to the cover between the pivotal coupling of the first and second portions of the cover.

In various embodiments, the second portion may be arranged to adjustably pivot around the two or more seams to form a triangular stand to support the enclosure in an open configuration. In some embodiments, the second portion may have at least one integrated magnet arranged to adjustably couple a portion of the cover to a back of the enclosure. In some embodiments, the first and second portions may be arranged to align with a back of the enclosure in a first tablet configuration and the display may be arranged to be accessible and operable in the first tablet configuration and the input device may be arranged to be accessible and inoperable in the first tablet configuration.

In some embodiments, the second portion may be arranged to adjustably pivot around the two or more seams to form a triangular stand to support the enclosure and to restrict rotation of the first portion when the first portion is arranged to align with a portion of the triangular stand in a second tablet configuration. In various embodiments, the first portion may be arranged to align with and conceal the display of the computing device in a closed configuration, the display and the input device arranged to be inaccessible and inoperable in the closed configuration.

In various embodiments, the first portion may be arranged to rotate around the one or more seams of the first portion to reveal a portion of the display in the closed configuration and the computing device may be operable to display one or more graphical user interface elements on the revealed portion of the display. The peek device may include, in some embodiments, one or more processor circuits, a touch sensitive display and/or one or more wireless transceivers operative to enable wireless communications for the computing device using one or more wireless communication protocols. Other embodiments are described and claimed.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile computing system comprising:
a display;
an enclosure to support the display on a front of the enclosure; and
a cover comprising:
a first portion comprising a keyboard and a groove to receive an edge of the enclosure, the first portion arranged to conceal the display in a closed configuration of the mobile computing system;
a second portion consisting of a first fractional portion and a second fractional portion; and
a first hinge directly coupling the first portion to the first fractional portion of the second portion, the first fractional portion of the second portion directly attached to the first hinge, the second portion further comprising a second hinge positioned between the first fractional portion and the second fractional portion, the first portion and the first fractional portion of the second portion forming an acute angle at the first hinge when the mobile computing system is in an open configuration, the second fractional portion of the second portion positioned on a back surface of the enclosure when the mobile computing system is in the open configuration.

2. The mobile computing system of claim 1, further comprising a processor circuit, wherein the cover further comprises a first electrical connector and the enclosure further comprises a second electrical connector to connect to the first electrical connector to communicatively couple the keyboard to the processor circuit.

3. The mobile computing system of claim 2, wherein the cover further comprises a first mechanical connector and the enclosure further comprises a second mechanical connector to connect to the first mechanical connector.

4. The mobile computing system of claim 1, further comprising a processor circuit and a memory, the enclosure to enclose the processor circuit and the memory.

5. The mobile computing system of claim 1, wherein a back of the enclosure opposite the front of the enclosure is arranged to align with the first portion and the second portion of the cover in a tablet configuration, the display arranged to be accessible in the tablet configuration.

6. The mobile computing system of claim 1, the second portion of the cover arranged to at least partially form a triangular stand to support the enclosure in an open configuration, the display and the keyboard arranged to be accessible in the open configuration.

7. The mobile computing system of claim 1, the display comprising a touch-sensitive display communicatively coupled to one or more processor circuits enclosed by the enclosure.

8. The mobile computing system of claim 1, further comprising one or more sensors comprising one or more of a camera, accelerometer, proximity sensor, light sensor, compass, or global positioning system.

9. The mobile computing system of claim 1, wherein the groove is distanced from the first hinge and the first portion is rigid.

10. The mobile computing system of claim 1, wherein the edge of the enclosure is a first edge, the enclosure further comprises a second edge that is distal from the first edge, the first portion further comprises a third edge that is distal from the first hinge, the third edge aligned with the second edge when the mobile computing system is in the closed configuration.

11. The mobile computing system of claim 1, wherein the first hinge comprises a flexible seam.

12. The mobile computing system of claim 1, wherein the edge of the enclosure received by the groove extends a length of the enclosure.

13. The mobile computing system of claim 1, wherein, when the mobile computing system is in the open configuration, the second fractional portion of the second portion extends along the back surface of the enclosure from where the second hinge is positioned on the back surface of the enclosure towards an end of the enclosure that is distal to the first hinge.

14. A cover comprising:
a first portion comprising a keyboard and a groove, wherein the groove receives an edge of a body of a tablet computer when the cover and the tablet computer are in an open configuration, wherein the first portion conceals a display of the tablet computer when the cover and the tablet computer are in a closed configuration;
a first hinge; and
a second portion consisting of a first fractional portion and a second fractional portion, the first fractional portion of the second portion directly attached to the first hinge, the second portion further comprising a second hinge positioned between the first fractional portion and the second fractional portion, wherein the first portion and the first fractional portion of the second portion form an acute angle at the first hinge when the cover and the tablet computer are in the open configuration, wherein the second fractional portion of the second portion is positionable on a back surface of the tablet computer when the cover and the tablet computer are in the open configuration.

15. The cover of claim 14, wherein the groove is distanced from the first hinge and the first portion is rigid.

16. The cover of claim 14, further comprising a first electrical connector to connect to a second electrical connector of the body of the tablet computer.

17. The cover of claim 14, further comprising a first mechanical connector to connect to a second mechanical connector of the body of the tablet computer.

18. The cover of claim 14, wherein when the cover and the tablet computer are in a tablet configuration, the display faces in a first direction and keyboard faces in a second direction that is opposite from first direction.

19. The cover of claim 14, wherein the first portion and the second portion form a triangular stand to support the body of the tablet computer when the cover and the tablet computer are arranged in an open configuration.

20. The cover of claim 14, wherein, when the cover and the tablet computer are in the open configuration, the second fractional portion of the second portion extends along the back surface of the tablet computer from where the second hinge is positioned on the back surface of the tablet computer towards an end of the tablet computer that is distal to the first hinge.

* * * * *